(12) United States Patent
Tokura et al.

(10) Patent No.: US 7,946,018 B2
(45) Date of Patent: May 24, 2011

(54) ASSEMBLY APPARATUS FOR BALL SCREW DEVICE, PARTS SUPPLY DEVICE AND COUNTER DEVICE

(75) Inventors: Shigeo Tokura, Kanagawa (JP);
Kazuyasu Chiba, Kanagawa (JP);
Zongxuan Zhang, Kanagawa (JP)

(73) Assignee: NSK Ltd., Tokyo (JP)

( * ) Notice: Subject to any disclaimer, the term of this patent is extended or adjusted under 35 U.S.C. 154(b) by 1259 days.

(21) Appl. No.: 11/546,351

(22) Filed: Oct. 12, 2006

(65) Prior Publication Data
US 2007/0137349 A1 Jun. 21, 2007

(30) Foreign Application Priority Data

Oct. 12, 2005 (JP) .............................. P. 2005-297534
Oct. 28, 2005 (JP) .............................. P. 2005-314507
Nov. 9, 2005 (JP) .............................. P. 2005-324688
Nov. 28, 2005 (JP) .............................. P. 2005-342259

(51) Int. Cl.
*B23P 11/00* (2006.01)
(52) U.S. Cl. ... 29/429; 29/441.1; 74/424.81; 74/424.82; 74/424.83; 74/424.84; 74/424.86
(58) Field of Classification Search ................ 29/441.1, 29/429; 74/424.81–424.86
See application file for complete search history.

(56) References Cited

FOREIGN PATENT DOCUMENTS

| JP | 6-23632 A | 2/1994 |
|---|---|---|
| JP | 6-319864 A | 11/1994 |
| JP | 7-617 A | 1/1995 |
| JP | 2530401 B | 6/1996 |
| JP | 2004-114224 A | 4/2004 |
| JP | 2004114224 A * | 4/2004 |

OTHER PUBLICATIONS

Japanese Office Action dated May 16, 2010, for Application No. 2005-342259.

* cited by examiner

*Primary Examiner* — Derris H Banks
*Assistant Examiner* — Azm Parvez
(74) *Attorney, Agent, or Firm* — Sughrue Mion, PLLC

(57) ABSTRACT

An assembly apparatus for assembling a ball screw device includes a support block, a nut arranged in a longitudinal direction, a nut reception base that arranges the nut so that its axial direction towards vertical direction of the assembly apparatus and that supports the nut so as to elevate the nut with respect to the support block, a temporary shaft inserted into an inner diameter side of the nut arranged on the nut reception base and rotatably supported by the support block, an inclined face provided at a forward end portion of the temporary shaft, for guiding balls into the nut raceway groove and a pushing mechanism that has elasticity in the radial direction of the temporary shaft and that pushes balls which are fed into the nut raceway groove by a forward end portion protruding from the outer circumferential face of the temporary shaft.

6 Claims, 27 Drawing Sheets

ASSEMBLY APPARATUS FOR BALL SCREW DEVICE, PARTS SUPPLY DEVICE AND COUNTER DEVICE

BACKGROUND OF THE INVENTION

1. Field of the Invention

The present invention relates to an assembly apparatus for a ball screw device and an assembly method thereof used for a feed mechanism of feeding a moving body of a mechanical device such as a machine tool or a precision machine.

The present invention further relates to a parts supply device for supplying spherical parts. The present invention also relates to a parts supply method thereof.

The present invention furthermore relates to a counter device for counting the number of spheres such as steel balls at a predetermined number.

2. Description of the Background Art

A conventional assembly apparatus for a ball screw device is composed as follows. In a ball screw device, a plurality of balls are charged and circulated into a plurality of circulation passages. The circulation passages include a spiral shaft raceway groove formed on an outer circumferential face of a screw shaft and further include a nut raceway groove, which is formed on an inner circumferential face of a cylindrical nut so as to oppose to the shaft raceway groove. The circulation passages furthermore include an S-shaped connection passage formed on a top portion for connecting a nut raceway groove. To the nut of the above ball screw device, a top portion is previously fixed. Inside the nut arranged in the longitudinal direction, a ball insertion jig having ball supply holes, the number of which is the same as that of the circulation passages, is arranged at the highest position of the nut raceway groove forming the circulation passage concerned while the phase of the ball insertion jig is made to agree with the phase of the nut. Predetermined numbers of balls are aligned in each ball feed hole and continuously fed, so that the balls can be charged into the circulation passage by its own weight. Then, the balls, which have not been charged by their own weight, are pushed into the circulation passage by an insertion rod. Concerning this technique, for example, refer to Japanese Patent Examined Publication JP-B-2530401.

However, the following problems may be encountered in the conventional art described above. The predetermined numbers of balls are aligned and fed into the ball feed hole all at once and the balls, which can not be put into the ball feed hole all at once, are pushed with the insertion rod so as to charge the balls into the circulation passage. Therefore, in the case of a top type ball screw device, when the lead of the nut raceway groove is small, the balls tend to be blocked. Accordingly, the balls, which could not be charged, must be pushed into the passage with the insertion rod. As a result, there are possibilities of damaging the balls.

In the case of a ball screw device having a connection passage laid in the axial direction of the nut such as an end cap type or a deflector type ball screw device, in order to feed balls into the connecting passage of the nut arranged in the longitudinal direction, the balls must be pushed with the insertion rod. Accordingly, there is a possibility that the balls are damaged.

In addition, the following problems may be encountered. A predetermined number of balls are aligned in the ball supply hole and fed all at once. Balls, which have not been able to be put into the ball supply hole, are pushed into the hole with the insertion rod so that the balls can be charged into the circulation hole. Accordingly, the smaller the lead of the nut raceway track groove is, the more frequently the balls are blocked.

Further, since the balls are simultaneously charged into a plurality of circulation passages, it is difficult to smoothly charge the balls. Therefore, the balls, which have not been able to be put into the ball supply hole, must be pushed into the hole with the insertion rod. Accordingly, there is a possibility that the balls are damaged.

The above problems are caused in the case where the dead weight of each ball is light when a diameter of the ball to be charged into the circulation passage is small.

Furthermore, in a conventional parts supply device, spherical parts (spheres) are supplied as follows. In a bottom portion of a hopper into which the spherical parts are put, a conical inclined face and a delivery hole for delivering the spheres are provided. The spheres, which have been introduced by rotating a rotary shaft, are delivered one by one from the delivery hole into a gap formed between a conical face at a foreword end portion of a rotary rod, which is arranged being opposed to the inclined face, and the inclined face. Concerning this technique, for example, refer to Japanese Patent Unexamined Publication JP-A-6-23632.

However, the following problems may be encountered in the technique described above. A conical face of a rotary rod and an inclined face of a hopper bottom portion are arranged being opposed to each other. Into the gap, spheres are introduced by rotating the rotary rod, so that the spheres can be delivered from a delivery hole one by one. Accordingly, when the gap formed between the conical face and the inclined face is too large, an effect of rotating the rotary rod is diminished. Therefore, the spheres are collected from the periphery to the delivery hole all at once. Accordingly, the spheres are piled up and blocked.

When the gap formed between the conical face and the inclined face is too small, it is impossible to introduce the spheres into the gap. Accordingly, the spheres cannot be delivered.

Therefore, the attaching accuracy of attaching the rotary rod for forming the gap must be accurately controlled. Accordingly, in the case where a production lot of producing the spheres accommodated in the hopper is changed, it becomes necessary to highly accurately adjust the gap each time the production line is changed.

In the case where a diameter of the sphere is changed, a hole diameter of the delivery hole must be changed. Further, it is necessary to adjust a length of the rotary rod. Furthermore, it is necessary to highly accurately adjust the attaching accuracy of attaching the rotary rod. Therefore, it takes time to conduct a preparatory work of the parts supply device, which deteriorates the production efficiency.

A conventional counter for counting steel balls counts the number of the steel balls as follows. In an upper portion of a guide member formed out of a non-magnetic material in which a steel ball passage is formed, a magnet is arranged. At a lower end of this magnet, a cylindrical magnetic body and electromagnetic coil are arranged. In a lower portion of the magnetic body, a sensor is arranged and a steel ball stoppage releasing device is formed. Steel balls, which are aligned in the steel ball passage, are released when the electromagnetic coil is energized so that a magnetic force of the magnet can be canceled out and the steel ball passage can be opened, and the number of the steel balls passing through a counting sensor is counted. When a predetermined number of steel balls have passed through the counting sensor, the electromagnetic coil is energized so that a magnetic force of the magnet can be intensified, and the steel balls are stopped and the number of the steel balls is counted. Concerning this technique, for example, refer to Japanese Patent Unexamined Publication No. JP-A-6-319864.

In a periphery of a shaft body pivotally arranged in a leading passage, a spiral flange portion having a pitch larger than a diameter of a steel ball is formed. When the shaft body is rotated by a pulse motor, the number of steel balls passing, which are sent downward by the flange portion, is counted with a counting sensor. When a predetermined number of steel balls have passed through the counting sensor, the pulse motor is stopped so as to stop the steel balls, and the number of the steel balls is counted. Concerning this technique, for example, refer to Japanese Patent Unexamined Publication No. JP-A-7-617.

However, according to the technique described in JP-A-6-319864, the following problems may be encountered. In the technique described in JP-A-6-319864, the steel balls are stopped by a magnetic force. Accordingly, there is a possibility that the steel balls, which have been counted, are magnetized. Therefore, it is necessary to add a step of demagnetizing the steel balls.

Further, the steel balls are made to pass through by their dead weight. Therefore, in the case where a diameter of the steel ball is small, the dead weight becomes light. Accordingly, there is a possibility that a flow of the steel balls becomes unstable.

According to the techniques described in JP-A-6-319864 and JP-A-7-617, the number of steel balls is counted by the counting sensor. Therefore, when the counting sensor has conducted counting on a predetermined number of steel balls, it is necessary to stop a flow of the steel balls by controlling a control unit so that an electromagnetic coil and a drive unit can be operated. For the above reasons, a structure of the counter becomes complicated. Therefore, when a diameter of the steel ball to be counted is changed, it takes time to change a preparatory work of the counter.

SUMMARY OF THE INVENTION

The present invention has been accomplished to solve the above problems. One of objects of the present invention is to provide an assembly apparatus for a ball screw device characterized in that even when the ball screw device has a connection passage formed in the axial direction of the nut, the balls are prevented from being damaged and no balls are blocked in the connection passage.

Further, another objects of the present invention is to provide an assembly device for assembling a ball screw device characterized in that even balls, the weight of which is light, are prevented from being damaged and there is no possibility that the balls are blocked.

Furthermore, another objects of the present invention is to provide a means for smoothly delivering spheres by preventing the spheres from being blocked without conducting a highly accurate adjustment work.

In addition, another objects of the present invention is to provide a counting means for stably counting the number of steel balls, the diameter of which is even small, and for making it easy to change a preparatory work of the counter.

In order to solve the above problems, there is provided an assembly apparatus for assembling a ball screw device which comprises:

a screw shaft provided with a spiral shaft raceway groove on an outer circumference thereof;

a cylindrical nut provided with a nut raceway groove on an inner circumferential face thereof so as to oppose to the shaft raceway groove;

a connection passage that makes a circulation passage together with the shaft raceway groove and the nut raceway groove; and a plurality of balls circulating in the circulation passage, the assembly apparatus comprising:

a support block;

a nut arranged in the longitudinal direction;

a nut reception base that arranges the nut so that its axial direction towards vertical direction of the assembly apparatus and that supports the nut so as to elevate the nut with respect to the support block;

a temporary shaft that is inserted into an inner diameter side of the nut arranged on the nut reception base and that is rotatably supported by the support block;

an inclined face provided at a forward end portion of the temporary shaft, for guiding balls into the nut raceway groove, the number of which is the same as that of the balls to be charged into the circulation passage; and a pushing mechanism that has elasticity in the radial direction of the temporary shaft and that pushes balls which are fed into the nut raceway groove by a forward end portion protruding from the outer circumferential face of the temporary shaft.

Due to the foregoing, the invention provides the following advantages. Steel balls (balls), which have been fed into the nut raceway groove by rotating the temporary shaft, can be moved while being pushed with a protruding foreword end portion of the pushing mechanism. Therefore, the steel balls can be smoothly fed from a lower portion of the connecting passage of the nut arranged in the longitudinal direction. Therefore, the steel balls can be prevented from being blocked. Further, the protruded end portion of the pushing mechanism is can be moved so as to appear/disappear in the radial direction from the outer circumferential face of the temporary shaft by elasticity. Accordingly, the protruding forward end portion of the pushing mechanism can easily get over the steel balls which stop in the nut raceway groove. Accordingly, it is possible to prevent the steel balls from being damaged.

Further; according to the present invention, there is provided an assembly device for assembling a ball screw device which comprises:

a screw shaft provided with a spiral shaft raceway groove on an outer circumference thereof;

a cylindrical nut provided with a nut raceway groove on an inner circumferential face thereof so as to oppose to the shaft raceway groove;

a connection passage that makes a circulation passage together with the shaft raceway groove and the nut raceway groove; and a plurality of balls circulating in the circulation passage, the assembly device for assembling the ball screw device comprising:

a support block;

a nut arranged in the longitudinal direction;

a nut reception base that arranges the nut so that its axial direction towards vertical direction of the assembly apparatus and that supports the nut so as to elevate the nut with respect to the support block;

a temporary shaft that is inserted into an inner diameter side of the nut arranged on the nut reception base and that is rotatably supported by the support block;

an inclined face provided at a forward end portion of the temporary shaft; and a negative pressure chamber that supplies negative pressure to a gap between a shoulder portion of the temporary shaft defined between the inclined face and an outer circumferential face and an inner circumferential face of the nut.

Due to the above constitution, the present invention can provide the following advantages. Balls are collected to the shoulder portion of the temporary shaft by the inclined face provided in the temporary shaft. The balls, which have been sucked and held by negative pressure, can be smoothly fed into the nut raceway track groove by utilizing a frictional force generated between the balls and the shoulder portion when the temporary shaft is rotated. Even in the case where the lead of the nut raceway track groove is small and the dead weight of the balls to be charged into the circulation passage is light, it is possible to prevent the balls from being blocked. Further, the balls can be prevented from being damaged.

According to the present invention, there is also provided a parts supply device comprising:

a funnel-shaped hopper, into which a plurality of spheres are put, the hopper comprising:

an inclined face decreasing in an axial direction thereof; and a delivery hole provided in a bottom portion thereof, from which the spheres are delivered out; and an air nozzle comprising an injection hole opposed to an opening on the inclined face side of the delivery hole, wherein an axial center of the delivery hole and an axial center of the air nozzle injection hole are made to agree with each other.

Furthermore, according to the invention, there is provided a parts supply device comprising:

a funnel-shaped hopper, into which a plurality of spheres are put, the hopper comprising:

an inclined face decreasing in an axial direction thereof, a rotary shaft idly engaged with an engagement hole provided in a bottom portion thereof;

a delivery hole formed in an axial direction of the rotary shaft, from which the spheres are delivered out;

an introduction hole which is formed in parallel with the inclined face and communicates with the delivery hole; and a leading plate arranged on an upstream side in the rotary direction of the rotary shaft on an opening face of the rotary shaft onto which the introduction hole is open, having a guide portion expanding toward a downstream side in the rotary direction.

As described above, according to the present invention, the delivery hole for delivering the spheres is provided on the bottom portion of the funnel-shaped hopper having the inclined face decreased in the axial direction. The air injection hole of the air nozzle is arranged being opposed to the opening of the delivery hole. The axial center of the delivery hole and that of the injection hole of the air nozzle are arranged so that they can be made to agree with each other. Due to the above structure, the sphere, which has been put into the hopper, can be pushed into the delivery hole by a jet of air from the injection hole. At the same time, by the diffusion current generated by this sphere, the other sphere can be pushed back to the outside in the radial direction of the hopper. Accordingly, it is possible to prevent the spheres, which are rolling on the inclined face by the dead weight, from concentrating on the opening of the delivery hole. Therefore, it is possible to prevent the spheres from being blocked. As a result, it is possible to provide an advantage that the spheres, which have been put into the hopper, can be smoothly delivered from the delivery hole.

There is provided a rotary shaft idly engaging with an engagement hole formed in the bottom portion of the funnel-shaped hopper having the inclined face which is decreased in the axial direction. In this rotary shaft, the introduction hole is formed which is formed in parallel with the inclined face and communicated with the delivery hole. Onto the opening face on which this introduction hole is open, and the leading plate is attached so as to introduce the spheres onto the introduction hole. Due to the above structure, the spheres, which have been put into the hopper, can be introduced into the introduction hole by the guide portion of the leading plate while the spheres are being stirred by the leading plate. Accordingly, it is possible to prevent the spheres, which are rolling on the inclined face by the dead weight, from concentrating on the opening of the introduction hole. Therefore, it is possible to prevent the spheres from being blocked. As a result, it is possible to provide an advantage that the spheres, which have been put into the hopper, can be smoothly delivered from the delivery hole.

According to the invention, there is provided a counter device comprising:

a counting pipe that aligns and accommodates a predetermined number of spheres to be counted;

a main body comprising:

an engagement hole that has a bottom and with which the counting pipe is engaged; and a suction hole having an opening on the bottom of the engagement hole, wherein a diameter of the opening of the suction hole is formed to be smaller than that of the sphere, a center of the opening of the suction hole is arranged to be shifted from the center of the inner diameter of the counting pipe, and the spheres aligned in the counting pipe are sucked and held when negative pressure is supplied to the suction hole.

According to the invention, there is further provided a counter device comprising:

a counting recess portion that accommodates spheres to be counted; and suction holes, the number of which is the same as that of the spheres to be counted, having an opening on a bottom face of the counting recess portion, wherein a diameter of the opening of the suction hole is formed to be smaller than that of the sphere, suction holes, which are adjacent to each other, are arranged at intervals larger than the diameter of the sphere, and the spheres are sucked and held by the suction holes when negative pressure is supplied to the suction holes.

Due to the foregoing, the present invention can provide the following advantages. By a counter, the structure of which is simple, irrespective of the diameter of spheres, it is possible to stably count the number of the spheres. Further, only when the counter is replaced, a change in the preparatory work of the counter can be easily executed.

Further, by a counter, the structure of which is simple, irrespective of the diameter of spheres, the spheres can be positively sucked and held, and the number of the spheres can be stably counted. When a predetermined condition is satisfied, the counter is not replaced. When a predetermined condition is not satisfied, only by replacing the counter, a change in the preparatory work of the counter can be easily conducted.

DETAILED DESCRIPTION OF THE PREFERRED EMBODIMENTS

Figure 1:
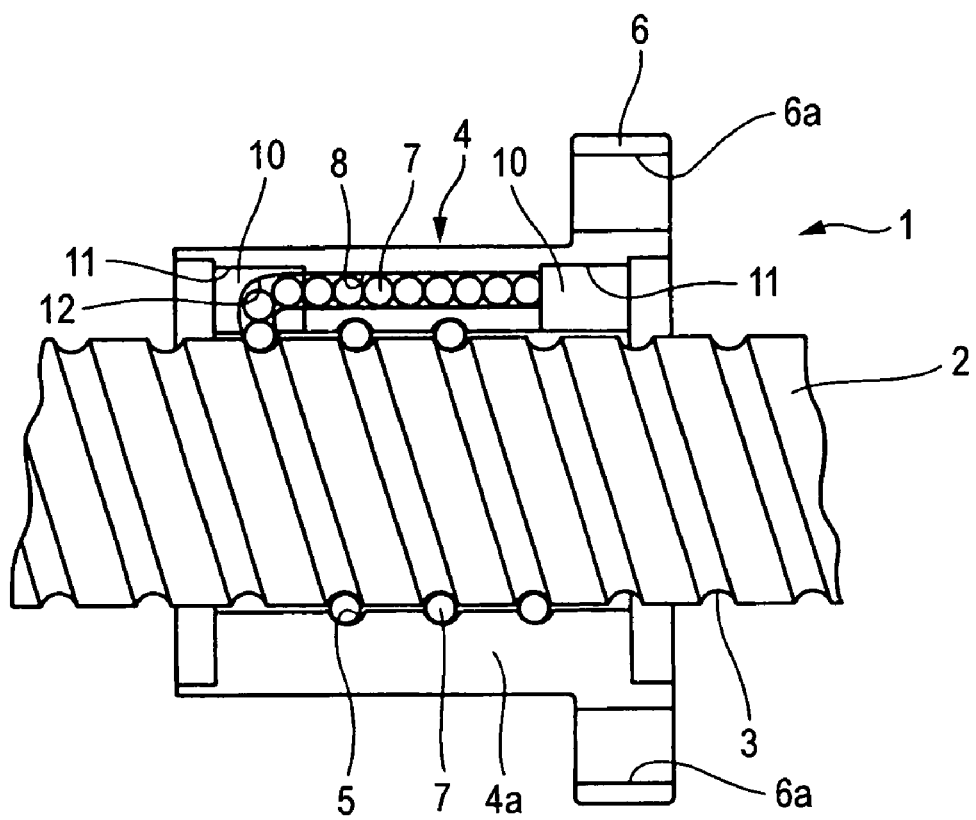
FIG. 1 is a schematic illustration showing a cross-section of a ball screw device of Embodiment 1.

Referring to the drawings, embodiments of the invention will be explained below.

First, an embodiment of the assembly apparatus of the ball screw device of the present invention will be explained below.

Embodiment 1

Figure 2:
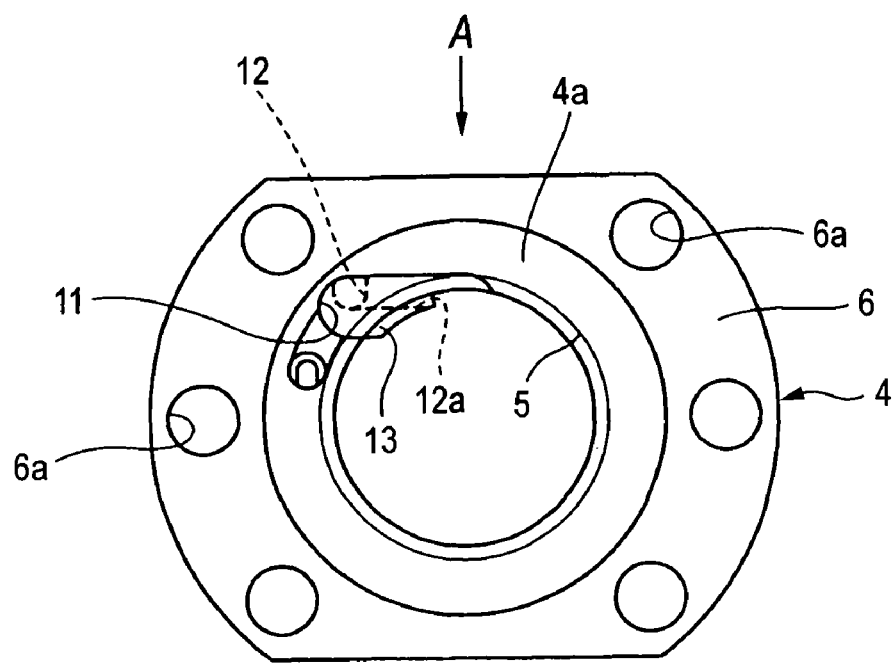
FIG. 2 is a schematic illustration showing a state of attaching an end deflector of Embodiment 1.
Figure 3:
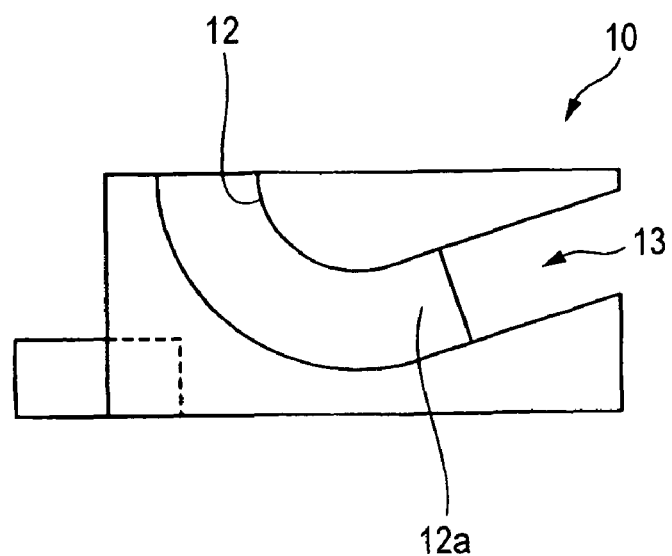
FIG. 3 is a view taken in the direction A of an end deflector of Embodiment 1.
Figure 4:
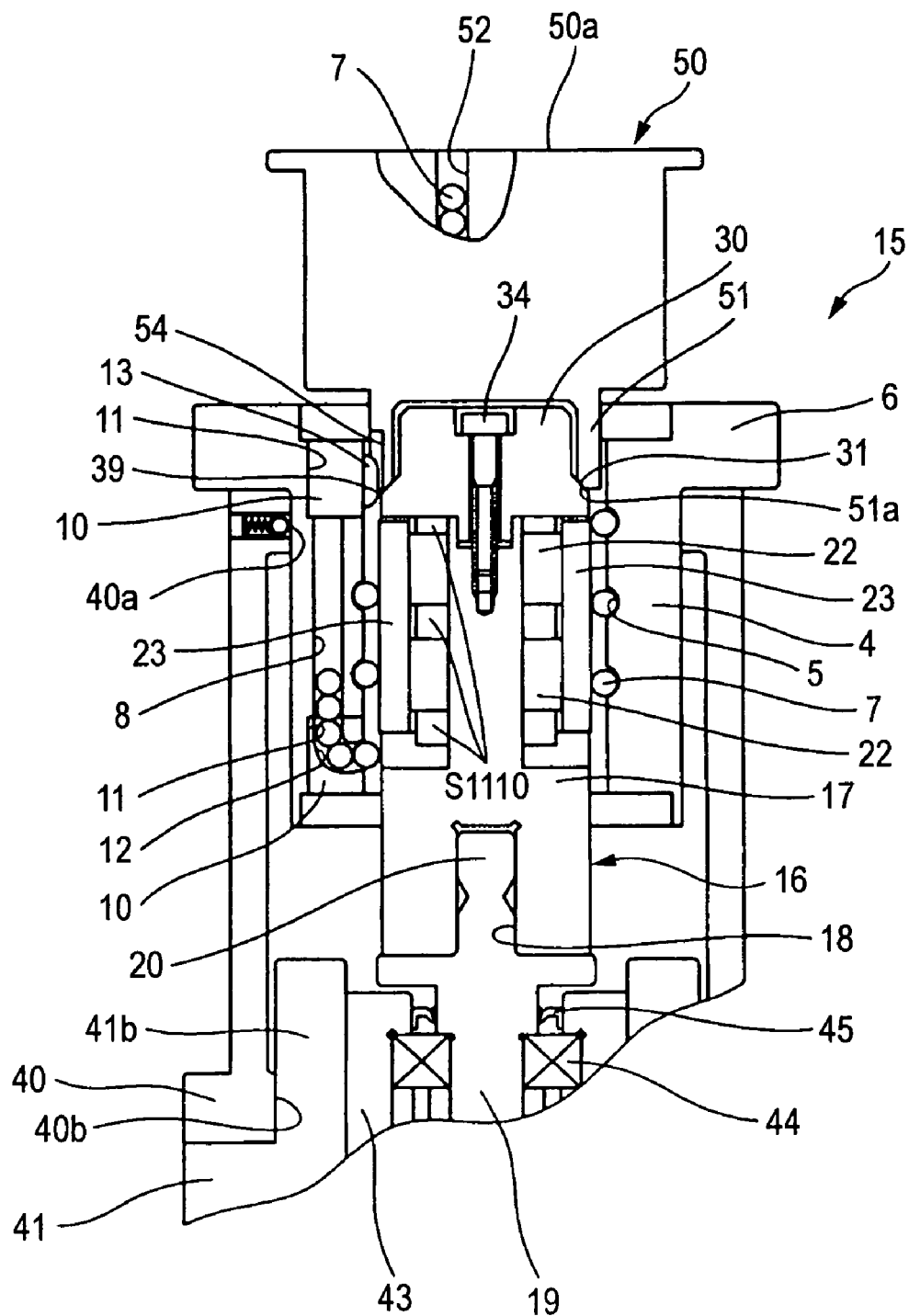
FIG. 4 is a sectional view showing an assembly apparatus for a ball screw device of Embodiment 1.
Figure 5:
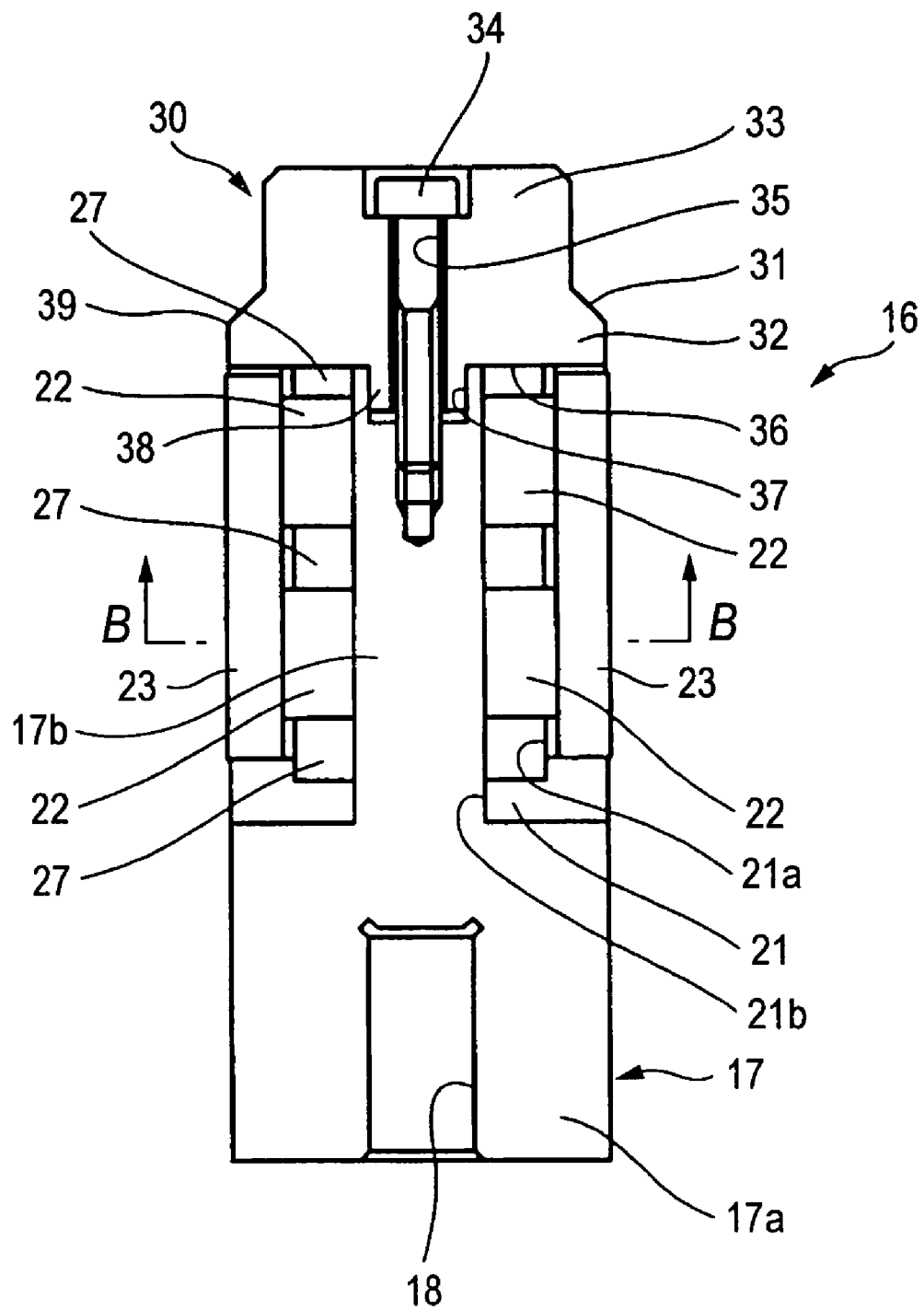
FIG. 5 is a schematic illustration showing a cross-section of a temporary shaft of Embodiment 1.
Figure 6:
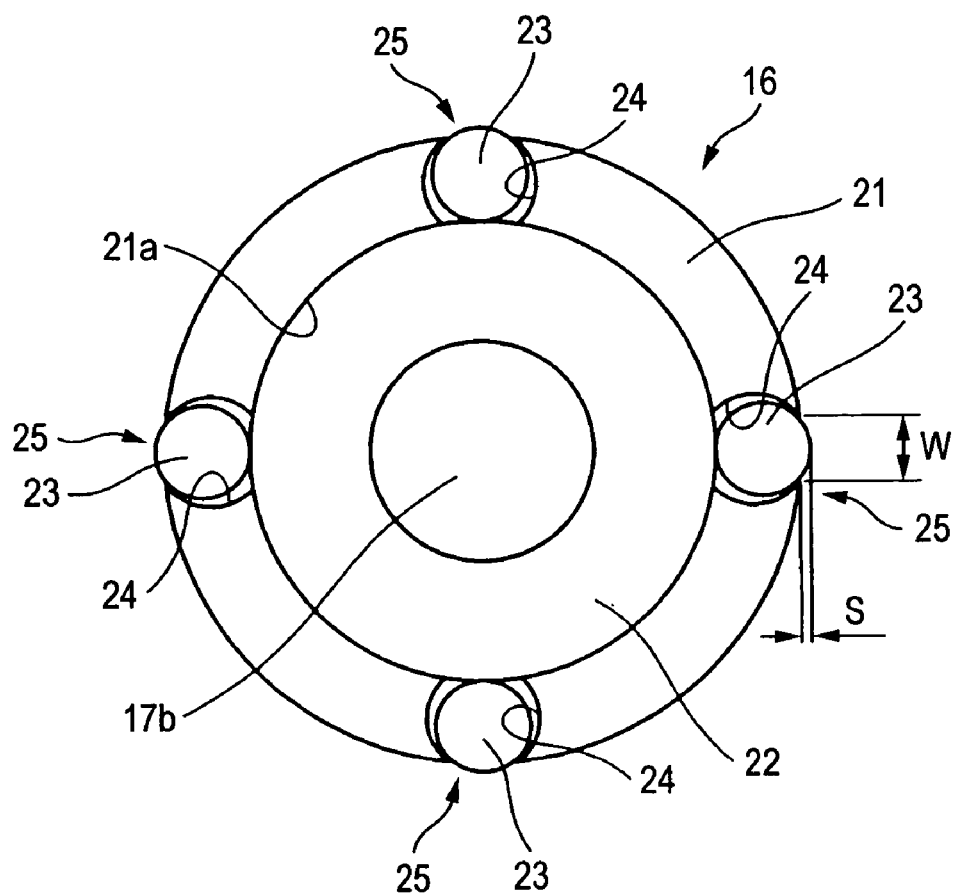
FIG. 6 is a schematic illustration showing a cross-section B-B in FIG. 5.
Figure 7:
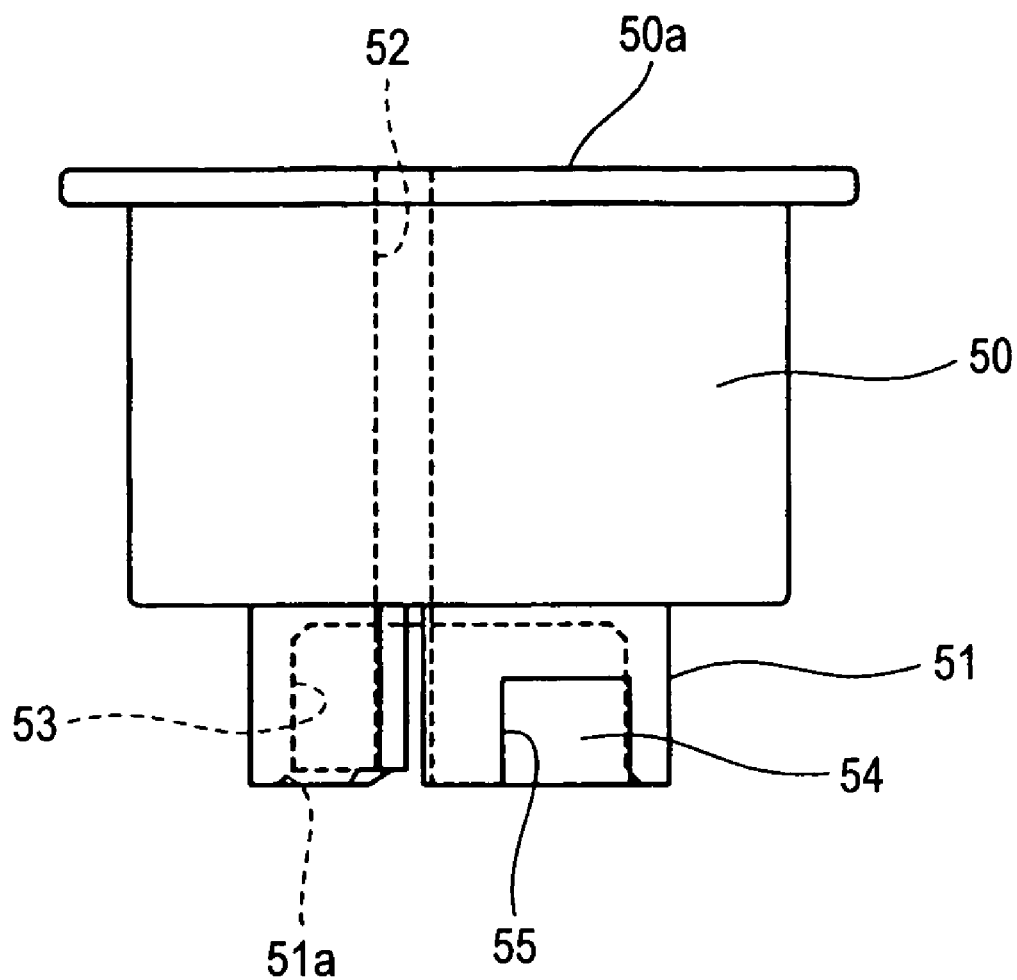
FIG. 7 is a schematic illustration showing a side of a ball insertion jig of Embodiment 1.
Figure 8:
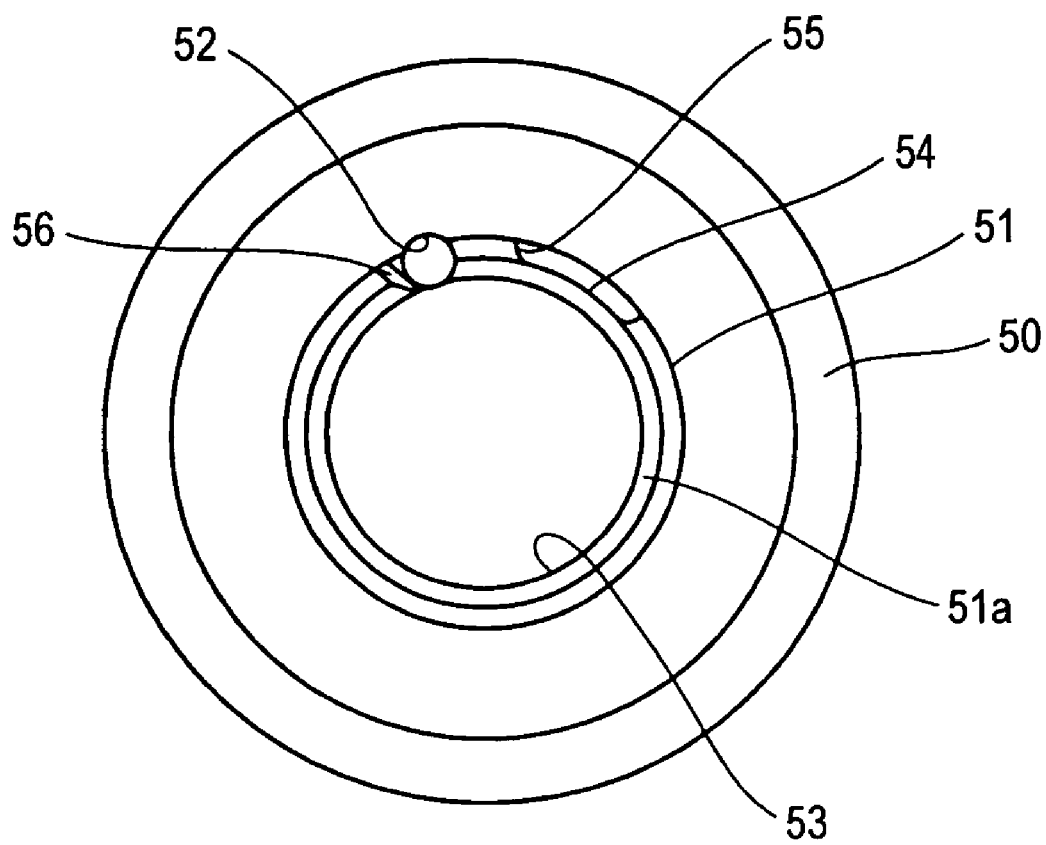
FIG. 8 is a schematic illustration showing a lower face of a ball insertion jig of Embodiment 1.

FIG. 1 is a schematic illustration showing a cross section of the ball screw device of Embodiment 1. FIG. 2 is a schematic illustration showing a state in which an end deflector of Embodiment 1 is attached. FIG. 3 is a view taken in the direction of arrow A of the end deflector of Embodiment 1. FIG. 4 is a sectional view showing an assembly apparatus of the ball screw device of Embodiment 1. FIG. 5 is a schematic illustration showing a cross section of the temporary shaft of Embodiment 1. FIG. 6 is a schematic illustration showing a cross section B-B in FIG. 5. FIG. 7 is a schematic illustration showing a side of a ball insertion jig of Embodiment 1. FIG. 8 is a schematic illustration showing a lower face of the ball insertion jig of Embodiment 1.

In this connection, FIG. 3 is a view of the end deflector taken in the direction of arrow A shown in FIG. 2. In FIG. 1, reference numeral 1 is a ball screw device. In the present embodiment, reference numeral 1 is a ball screw device of the deflector type. Reference numeral 2 is a screw shaft of the ball screw device 1, which is a rod-shaped member made of alloy steel. On an outer circumferential face, a shaft raceway groove 3, of which sectional shape is a substantial semicircle, is spirally formed by a predetermined lead.

On the screw shaft 2 of the present embodiment, one row of the shaft raceway groove 3 is formed.

Reference numeral 4 is a nut of the ball screw device 1, which is a cylindrical member made of steel such as alloy steel. A nut raceway groove 5, of which sectional shape is a substantial semicircle, and which is opposed to the shaft raceway groove 3, is formed on the inner circumferential face of the nut 4, by the same lead as that of the shaft raceway groove 3.

At one end portion of the outer circumferential portion of the nut 4, a flange portion 6 is provided. By a bolt hole 6*a* provided in the flange portion 6, the device is fixed to a moving base of a mechanical device (not shown) with bolts and others.

Reference numeral 7 is a steel ball, which is a spherical body made of steel such as alloy steel. A plurality of steel balls 7 are charged into a load passage, which is formed out of the shaft raceway groove 3 and the nut raceway groove 5. The screw shaft 2 and the nut 4 are screwed to each other.

Reference numeral 8 is a return passage. The return passage 8 is a through-hole, which is formed in a thick portion 4*a* of the side wall of the nut 4. Diameter of the return passage 8 is larger than that of the steel ball 7 so that the steel ball 7 can be circulated therein. This return passage 8 is formed so as to penetrate the thick portion 4*a* of the nut 4 in the axial direction. The number of this return passage 8 corresponds to the number of the nut raceway groove 5 formed in the nut 4. In this embodiment, the number of the nut raceway groove 5 formed in the nut 4 is one.

Reference numeral 10 is an end deflector made of metallic material or resin material. The end deflector 10 is engaged in the engagement holes 11 formed at both end portions in the axial direction of the return passage 8 formed in the thick portion 4*a* of the nut 4. On the nut 4 side, a direction change passage 12 is formed which is a curved passage for connecting a load passage. The load passage is formed out of the nut raceway groove 5 and the shaft raceway groove 3 opposed to each other, with the return passage 8 of the nut 4.

In FIGS. 2 and 3, reference numeral 13 is a tongue portion, which is a protrusion, the cross section of which is arcuate, which idly engages in the twisting direction of the shaft raceway groove 3 formed on the screw shaft 2 side of the end deflector 10. An end portion 12*a* of the direction change passage 12 located in the tongue portion 13 is a scooping face for scooping up the steel balls 7 from the shaft raceway groove 3.

At both end portions of the above load passage, a circulation passage is formed which is connected with the connecting passage formed out of the direction change passage 12 of the end deflector 10 and the return passage 8 of the nut 4. Into this circulation passage, a plurality of steel balls 7 and a predetermined quantity of grease are enclosed. The steel balls 7, which are rolling in the load passage, are circulated while being scooped up by the tongue portion 13 to the connecting passage. When the screw shaft 2 is rotated, while the steel balls 7 are circulating in the circulation passage, the nut 4 is moved in the axial direction.

In FIG. 4, reference numeral 15 is an assembly apparatus of assembling the ball screw device 1, which is an assembly apparatus for charging the steel balls 7 into the circulation passage.

Reference numeral 16 is a temporary shaft, which is a rod-shaped member 10 inserted into the inner diameter side of the nut 4 instead of the screw shaft 2 at the time of charging the steel balls 7 into the nut 4. An engaging hole 18, which is formed at an end portion of the large diameter shaft 17a of the base shaft 17 formed as a stepped shaft, is engaged with the protrusion shaft portion 20 at the end portion of the shaft 19, and the cutout portion arranged in that portion is pushed and fixed with a set screw.

In FIGS. 5 and 6, reference numeral 21 is an external cylinder, which is a cylindrical member in which a stepped hole is formed along the axial core. The small diameter hole 21b is engaged with the small diameter shaft 17b of the base shaft 17 at an end portion on the shaft 19 side. An outer diameter of the external cylinder 21 is 20 determined in such a manner that a predetermined gap, (for example, 0.03 to 0.05 mm) is subtracted from an inner circumferential diameter of the nut that is smaller than BCD (Ball Center Diameter) of the nut to be assembled by radius of the steel ball 7 (i.e., a diameter of an inscribed circle of the steel balls 7 charged into the nut raceway groove 5).

That is, outer diameter of external cylinder 21 is equal to "BCD−ball diameter" minus gap (for example, 0.03 to 0.05 mm). This relationship also means following equation:

outer diameter of external cylinder 21=(nut groove diameter)−(ball diameter)×2−gap Reference numeral 22 is an annular elastic body, which is an annular elastic body made of elastic material such as natural rubber or synthetic rubber. An inner circumferential face of the annular elastic body 22 is engaged with the small diameter shaft 17b of the base shaft 17. The annular elastic body 22 is arranged at the center of the columnar body 23 which is a protruding member.

The columnar body 23 is made of material such as resin material or metallic material which is harder than the material of the annular elastic body 22. As shown in FIG. 6, the columnar body 23 is inserted into the insertion hole 24. In this case, a plurality of insertion holes 24 are formed in the axial direction on the side wall of the large diameter hole 21a of the external cylinder 21. When one portion on the outer circumferential face of the columnar body 23 is pushed by an outer circumferential face of the annular elastic body 22, an opposite side in the radial direction of the pushing portion is pushed out from the outer circumferential face of the outer cylinder 21.

A diameter of the insertion hole 24 of the outer cylinder 21 is larger than the thickness of the side wall of the larger diameter hole 21a of the outer cylinder 21. The insertion holes 24 of the outer cylinder 21 are formed at positions where a slit-shaped opening (an outer circumferential face opening portion 25) on the outer circumferential face of the outer cylinder 21 and a slit-shaped opening portion on the circumferential face of the large diameter hole 21a are formed. In the present embodiment, the insertion holes 24 are equally arranged at four positions in the circumferential direction of the outer cylinder 21.

Width W shown in FIG. 6 of the outer circumferential face opening portion 25 is set at a width so that a protrusion S at the forward end portion of the protruding portion from the outer circumferential face of the outer cylinder 21 of the outer circumferential face of the columnar body 23 can provide a predetermined pushing margin on the outside in the radial direction of the inscribed circle of the steel ball 7 charged into the nut raceway groove 5.

An outer diameter of the above columnar body 23 is formed as follows. When the columnar body 23 protrudes by the protrusion S described before, the outer diameter of the above columnar body 23 is formed so that the columnar body 23 can come into contact at least with the circumferential face of the large diameter hole 21a. A length of the above columnar body 23 in the axial direction is formed to be longer than one lead of the nut raceway groove 5 and to be shorter than a length obtained when a diameter of the steel ball 7 is subtracted from the distance between the centers of the tongue portion 13 of the end deflector 10 attached to both end portions of the return passage 8.

A diameter of the outer circumferential face of the annular elastic body 22 is formed so that the outer circumferential face of the annular elastic body 22 can be contacted with the outer circumferential face of the columnar body 23, which protrudes onto the large diameter hole 21a side in a free condition when the outer circumferential face of the columnar body 23 inserted into the insertion hole 24 is inscribed with the outer circumferential face of the outer cylinder 21.

The pushing mechanism of the present embodiment includes: a columnar body 23 held in the insertion hole 24 being capable of moving in the radial direction of the temporary shaft 16; and an annular elastic body 22 for pushing the columnar body 23 with the elasticity so that the annular elastic body 22 can be moved in the radial direction from the outer circumferential face opening portion 25 of the insertion hole 24.

Reference numeral 27 is an adjustment spacer, which is an annular member made of metallic material. An inner circumferential face of the adjustment spacer is engaged with the small diameter shaft 17b of the base shaft 17. A diameter of the outer circumferential face of the adjustment spacer is formed to be smaller than the diameter of the large diameter hole 21a of the outer cylinder 21.

The adjustment spacers 27 are arranged so that one annular elastic body 22 can be interposed between the adjustment spacers 27. When the annular elastic bodies 22, which are in a free condition, are interposed between a plurality of adjustment spacers 27 and stacked, the entire length of the stacked body becomes longer than the length in the axial direction of the small diameter shaft 17b of the base shaft 17 protruding from the small diameter hole 21b of the outer cylinder 21. Thickness of the adjustment spacer 27 is selected and determined in this way.

Reference numeral 30 is a lid body. The lid body 30 includes: a conical face 31 which is an inclined face of the temporary shaft 16 expanding toward the shaft 19 side; a flange portion 32, the diameter of which is formed into the same diameter as the outer diameter of the outer cylinder 21; a columnar boss portion 33 formed on the small diameter side of the conical face 31; a bolt hole 35 which is a through-hole, into which the bolt 34 is inserted, formed along the axis of the boss portion 33; a tightening face 36 which is a plane in a direction perpendicular to the axis on the opposite side to the conical face 31 of the flange portion 32; and a guide protrusion 38 idly engaged with the guide hole 37 at an end portion of the small diameter shaft 17b of the base shaft 17 formed at the center of the tightening face 36.

In this connection, an inclined face provided in the flange portion 32 is not limited to the above specific inclined face. The inclined face provided in the flange portion 32 may be an inclined face on which a plurality of inclined faces are polygonally formed. Alternatively, the inclined face provided in the flange portion 32 may be a combination of a conical face with a polygonal inclined face.

The temporary shaft 16 of the present embodiment is an assembled body including a base shaft 17, an outer cylinder 21, an annular elastic body 22, a columnar body 23, an adjustment spacer 27 and a lid body 30.

In FIG. 4, reference numeral 40 is a nut receiving base made of steel material such as alloy steel. A nut 4, which is an object to be assembled, is arranged in the longitudinal direction in the nut receiving base 40, which is a cylindrical member having an arrangement hole 40a with which an outer circumferential face of the nut 4 is engaged. An engagement hole 40b, which is formed at an end portion on the opposite side to the arrangement hole 40a, is engaged with an attaching portion 41a of the end portion of the slider 41.

In the arrangement hole 40a of the nut receiving base 40, a ball plunger 42, which protrudes in the radial direction, is provided on the inner circumferential face. A forward end portion of the ball plunger 42 pushes an outer circumferential face of the nut 4, so that the nut 4 and the nut receiving base 40 can be fixed.

Reference numeral 43 is a support block, which is a cylindrical member made of steel such as alloy steel. An outer circumferential face of the support block 43 is idly engaged with the inner circumferential face of the slider 41. Therefore, the slider 41 is supported with respect to the shaft 19 being capable of reciprocating in the axial direction.

In the slider 41, at an end portion on the opposite side to the attaching portion 41a of the nut receiving base 40, a positioning mechanism not shown, which conducts positioning in the axial direction, is provided. This positioning mechanism supports the nut receiving base 40 being capable of freely elevating with respect to the support block 43.

Reference numeral 44 is a rolling bearing such as a ball bearing. The inner ring is engaged with the shaft 19 and the outer ring is engaged with the inner circumferential face of the support block 43. Therefore, the rolling bearing 44 pivotally supports the shaft 19 being capable of rotating with respect to the support block 43.

Reference numeral 45 is a sealing body, which is an annular member made of elastic material such as natural rubber or synthetic rubber. An outer circumferential face of the sealing body 45 is engaged with the support block 43 and fixed. A lip portion provided on its inner circumferential face comes into slide contact with the outer circumferential face of the shaft 19. Therefore, the sealing body 45 functions as a contact type seal.

Reference numeral 50 is a ball insertion jig. In the ball insertion jig 50, an insertion portion 51 is formed, the outer diameter of which is a value obtained when a predetermined gap margin is subtracted from the diameter of the inner circumferential face of the nut 4. On an end face of the insertion portion 51, a conical recess portion 51a having the same conical face as the conical face 31 is formed being opposed to the conical face 31 formed on the lid body 30 at the forward end portion of the temporary shaft 16. Further, in the insertion portion 51, a ball introducing hole 52 is formed which penetrates the ball insertion jig 50 in the axial direction and extends from the upper face 50a to the conical recess portion 51a.

In the insertion portion 51 of the ball insertion jig 50, in order to avoid a contact with the boss portion 33 of the lid body 30 of the temporary shaft 16, a relief hole 53 is formed. As shown in FIGS. 7 and 8, a positioning groove 54 is formed which is engaged with the tongue portion 13 of the protrusion from the inner circumferential face of the nut 4 of the end deflector 10 and which determines an angular position between the ball introducing hole 52 and the end deflector 10 attached to the nut 4. An arcuate portion on the ball introducing hole 52 side functions as an engaging portion 55 for engaging the ball 7 which is going to return from the direction change passage 12 of the end deflector 10 charged in the nut 4 to the nut raceway groove 5.

In an opening portion of the ball introducing hole 52 of the insertion portion 51 of the ball insertion jig 50, on the opposite side in the circumferential direction of the positioning groove 54, a guide face 56 is formed which is an inclined face for guiding the steel balls 7, which have been put into the ball introducing hole 52, into the nut raceway groove 5.

The assembly apparatus 15 of the ball screw device 1 is assembled by incorporating each part described above as follows. The small diameter shaft 17b of the base shaft 17 is inserted into the small diameter hole 21b of the outer cylinder 21. The adjustment spacer 27, the inner circumferential of which is engaged with the small diameter shaft 17b, and the annular elastic body 22 are alternatively inserted and stacked, and the columnar body 23 is inserted into the insertion hole 24 of the outer cylinder 21. Then, the guide protrusion 38 of the lid body 30 is idly engaged in the guide hole 37 of the small diameter shaft 17b of the base shaft 17. The lid body 30 is fastened to the base shaft 17 with the bolt 34. In this way, the temporary shaft 16 is assembled.

At this time, the tightening face 36 of the lid body 30 pushes the adjustment spacers 27, which are previously stacked to a predetermined length, and the uppermost adjustment spacer 27 in which a length of the annular elastic body 22 is longer than the length in the axial direction of the small diameter shaft 17b. Therefore, the annular elastic body 22, which is arranged between the adjustment spacers 27, is pushed in the axial direction. Accordingly, the annular elastic body 22 is swelled by the elasticity in the radial direction and the columnar body 23 is pushed out in the radial direction. Therefore, an outer circumferential face of the columnar body 23 is protruded from the outer circumferential face of the outer cylinder 21 of the temporary shaft 16.

Next, the rolling bearing 44 and the sealing body 45 are engaged and assembled to the inner circumferential face of the support block 43. The shaft 19 is inserted into the sealing body 45. The shaft 19 is engaged and assembled to the inner ring of the rolling bearing 44. An inner circumferential face of the slider 41 is idly engaged with the outer circumferential face of the support block 43 and supported by a positioning mechanism not shown in the drawing.

The protruding shaft portion 20 of the shaft 19 is inserted into the engaging hole 18 of the temporary shaft 16 and tightened and fixed with a setting screw. The temporary shaft 16 is inserted into the through-hole 16b of the nut receiving base 40. The engaging hole 40b of the nut receiving base 40 is inserted into the attaching portion 41a of the slider 41. In this way, the assembly apparatus 15 is assembled.

Into the arrangement hole 40a of the nut receiving base 40 of the assembly apparatus 15 of the ball screw device 1 assembled in this way, the nut 4 is inserted in the longitudinal direction while the inner diameter side of the nut 4, which is an object to be assembled, is being inserted into the temporary shaft 16 and arranged by pushing with a forward end portion of the ball plunger 42 of the arrangement hole 40a. When the slider 41 is elevated by a positioning mechanism not shown, a corner portion (a shoulder portion 39) of the conical face 31 of the lid body 30 of the temporary shaft 16 and the outer circumferential face of the flange portion 32 is located in a portion close to the lower portion of the opening portion to the nut raceway groove 5 of the direction change passage 12 of the end deflector 10 engaged with the upper end portion of the return passage 8 arranged in the longitudinal direction of the nut 4.

The insertion portion 51 of the ball insertion jig 50 is inserted onto the inner diameter side of the nut 4 while the positioning groove 54 is being engaged with the tongue portion 13 of the end deflector 10. The conical recess portion 51a is put on the conical face 31 of the temporary shaft 16. Into the ball introducing hole 52 of the ball insertion jig 50, the steel balls 7 to be charged into one circulation passage, the number of which is predetermined, are put by using a counting dish.

The steel balls 7, which have been put into the ball introducing hole 52, are further put onto the conical face 31 of the temporary shaft 16 from the opening of the ball introducing hole 52. Then, the steel balls 7 are guided by the guide face 56 of the ball insertion jig 50 and rolled on the conical face 31 and reach the shoulder portion 39 of the temporary shaft 16. When the temporary shaft 16 is rotated in the direction of arrow C shown in FIG. 10 by the shaft 19 supported by the rolling bearing 44, the steel balls 7 are fed by its own weight into between the outer circumferential face of the outer cylinder 21 of the temporary shaft 16 and the nut raceway groove 5 of the nut 4.

Figure 10:
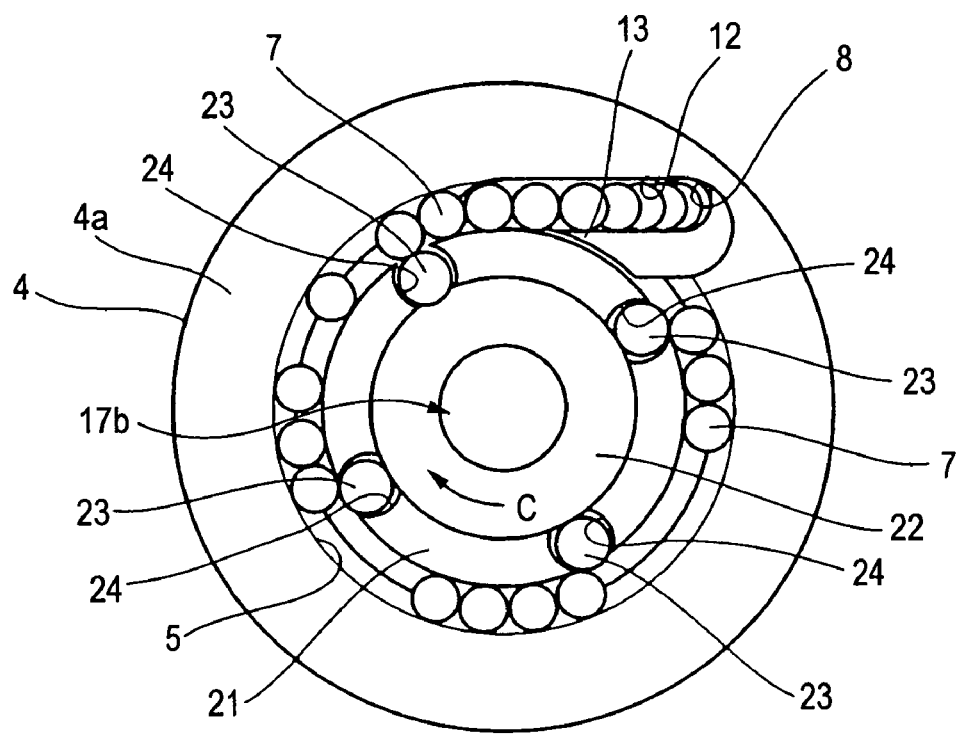
FIG. 10 is a schematic illustration showing a state of operation of a pushing mechanism of Embodiment 1.

As shown in FIG. 10, while the steel balls 7, which have been sent into the nut raceway groove 5, are being pushed by the elasticity of the annular elastic body 22 of the columnar body 23 protruded from the outer circumferential face of the outer cylinder 21, the steel balls 7 are moved in the nut raceway groove 5 and scooped up by the tongue portion 13 of the lower end deflector 10 and fed from the direction change passage 12 into the return passage 8.

Figure 9:
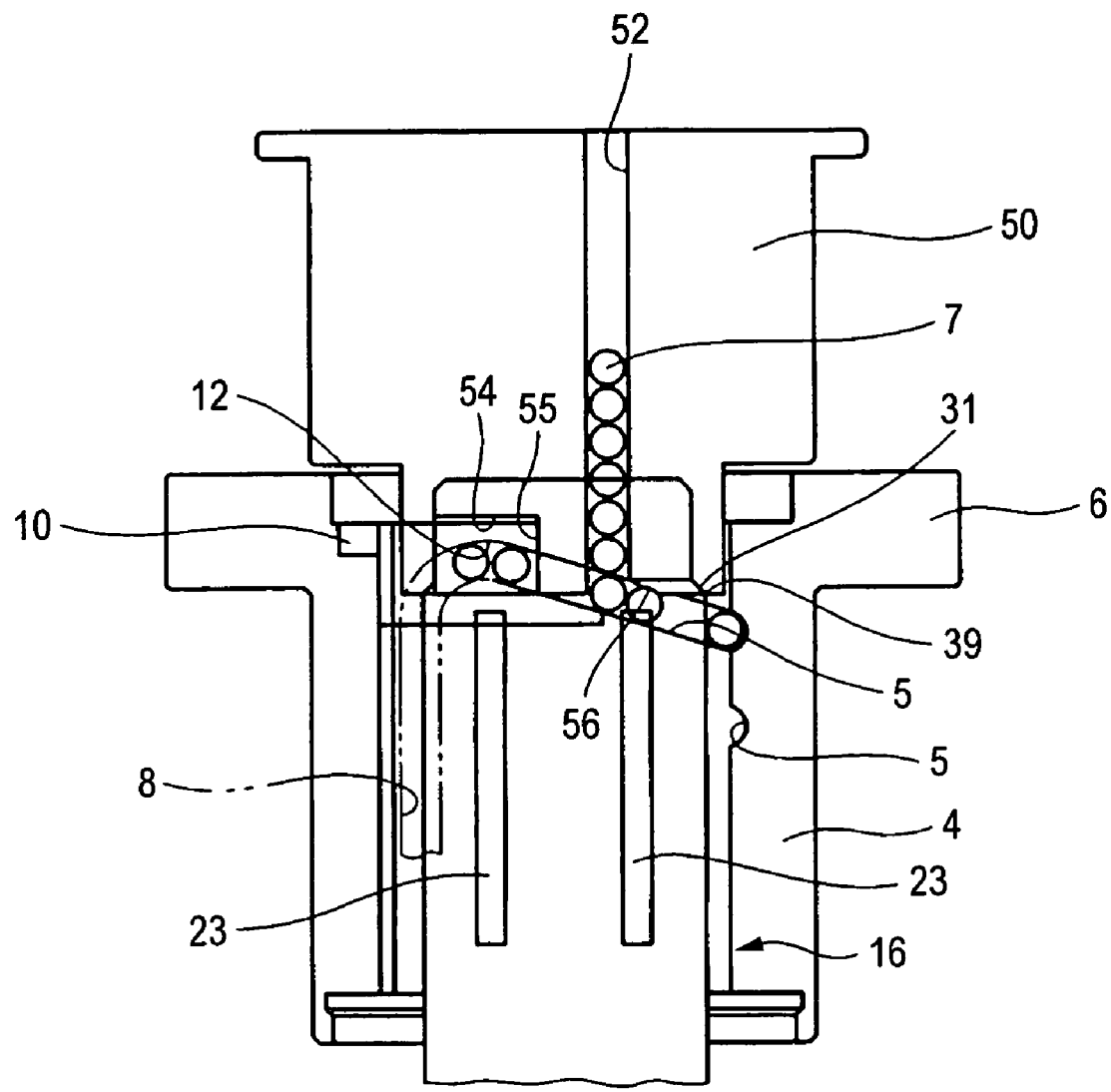
FIG. 9 is a schematic illustration showing a state of feeding steel balls of Embodiment 1.

At this time, by a frictional force generated by the pushing of the columnar body 23, the steel balls 7 moving in the nut raceway groove 5 in the neighborhood of the lower end deflector 10 are pushed and moved. Therefore, the steel balls 7 in the return passage 8, which are longitudinally arranged, are pushed up from below, and reach the upper direction change passage 12. As shown in FIG. 9, the leading steel ball 7 comes into contact with the engaging portion 55 of the positioning groove 54 of the ball insertion jig 50 and stops.

As described above, the steel balls 7 are charged in order into the return passage 8 and the connection passage including the direction change passage 12 arranged at both end portions. The steel balls 7 are aligned in the nut raceway groove 5 of the nut 4. In this way, the steel balls 7, the number of which is predetermined, which have been put into the ball introducing hole 52, are charged into the circulation passage.

In this case, even when the steel balls 7 are charged into all connection passages and a forward end portion of the columnar body 23 of the pushing mechanism pushes the steel balls 7 which stop in the nut raceway groove 5, since the columnar body 23 is composed so that it can be moved in the radial direction from the outer circumferential face of the outer cylinder 21 by the elasticity of the annular elastic body 22, the steel balls 7 can get over the columnar body 23 without being damaged. Further, no problems are caused in the rotation of the temporary shaft 16 in the direction C.

After the steel balls 7 have been charged into the circulation passage of the nut 4, the ball insertion jig 50 is removed and a sleeve not shown is engaged with the conical face 31 of the temporary shaft 16. Then, while the sleeve is being pushed, the nut 4 is pulled up and moved to the sleeve. Instead of the sleeve, the predetermined screw shaft 2 is screwed. In this way, the ball screw device 1 is assembled.

As described above, in the present embodiment, while the steel balls 7, which have been fed into the nut raceway groove 5, are being pushed by the protruding forward end portion of the columnar body 23 of the pushing mechanism, the steel balls 7 are smoothly moved. Therefore, the steel balls 7 are not blocked in the passage. The steel balls 7 can be easily fed into the connection passage, which is longitudinally arranged, from below the nut 4 which is longitudinally arranged.

The steel balls 7, which have reached the shoulder portion 39 of the temporary shaft 16 being guided by the guide face 56 of the ball insertion jig 50 and the conical face 32 of the temporary shaft 16, are fed into the nut raceway groove 5 when the temporary shaft 16 is rotated. Therefore, the steel balls 7 can be smoothly fed into the nut raceway groove 5.

Further, since the positioning groove 54 having an engaging portion 55 is provided in the insertion portion 51 of the ball insertion jig 50, the nut 4 and the ball introducing hole 52 can be easily positioned. Further, since the steel balls 7 charged into the connection passage are stopped by the engaging portion 55, there is no possibility that the steel balls, which have once charged into the connection passage, are mixed again into the nut raceway groove 5.

Further, only when the positioning groove 54 is engaged with the tongue portion 13 of the nut 4 arranged in the nut receiving base 40 and the steel balls 7, the number of which is predetermined, are put into the ball introducing hole 52 and the temporary shaft 16 is rotated, the steel balls 7 can be easily charged into the nut 4 having a connection passage laid in the axial direction and the working time of charging the steel balls can be reduced.

As explained above, in the present embodiment, operation is conducted as follows. On the nut receiving base supported by the support block of the assembly apparatus of the ball screw device being capable of freely elevating, the nut is arranged in the longitudinal direction. Onto the inner diameter side of the nut, the temporary shaft pivotally supported by the support block is inserted. The steel balls, the number of which is predetermined, which are put onto the conical face formed at the forward end portion of the temporary shaft, are fed from the shoulder portion into the nut raceway groove. By the elasticity of the annular elastic body of the pushing mechanism, the steel balls, which have been fed into the nut raceway groove, are pushed with the forward end portion of the columnar body protruding in the radial direction from the outer circumferential face of the temporary shaft. Due to the foregoing, the steel balls, which have been fed into the nut raceway groove by rotating the temporary shaft, can be moved while the steel balls are being pushed with the forward end portion of the protruding columnar body of the pushing mechanism. Therefore, the steel balls can be smoothly fed into the nut connection passage, which is arranged in the longitudinal direction, from below. Accordingly, it is possible to prevent the steel balls from being blocked. Since it is composed in such a manner that the forward end portion of the protruding columnar body can be moved in the radial direction from the outer circumferential face of the temporary shaft by the elasticity of the annular elastic body, the forward end portion of the protruding columnar body can easily get over the steel balls which stop in the nut raceway groove. Therefore, the steel balls can be prevented from being damaged.

In this connection, in the present embodiment, explanations are made as follows. When the temporary shaft is assembled, a length of the stacked adjustment spacers and the annular elastic bodies is set at a predetermined length, and the uppermost adjustment spacer is pushed by the tightening face of the lid body, so that the columnar body can be protruded in the radial direction by the elasticity of the annular elastic body. However, the following procedure may be adopted. The temporary shaft is temporarily assembled beforehand in the same manner described above, and the steel balls are temporarily charged into the nut which is an object to be assembled. According to an intensity of torque given to the shaft, the thickness of the uppermost adjustment spacer is changed so as to adjust a pushing force given to the columnar body.

In the present embodiment, explanations are made into the structure in which four insertion holes are equally formed in the circumferential direction of the outer cylinder. However, the number of the insertion holes is not limited to four. As long as the number of the insertion holes is two or more, any number of the insertion holes may be adopted.

Embodiment 2

Figure 11:
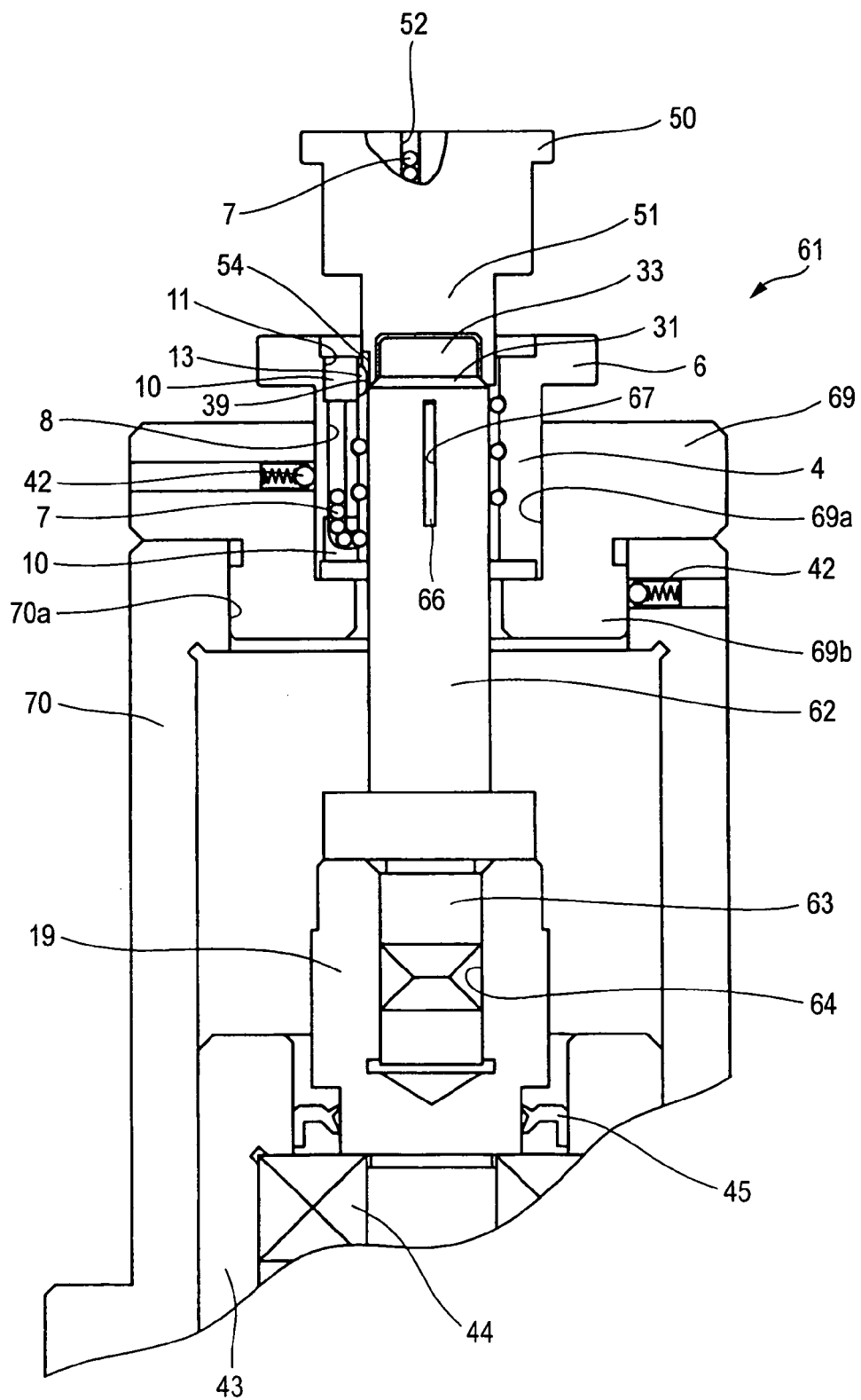
FIG. 11 is a sectional view showing an assembly apparatus for a ball screw device of Embodiment 2.
Figure 12:
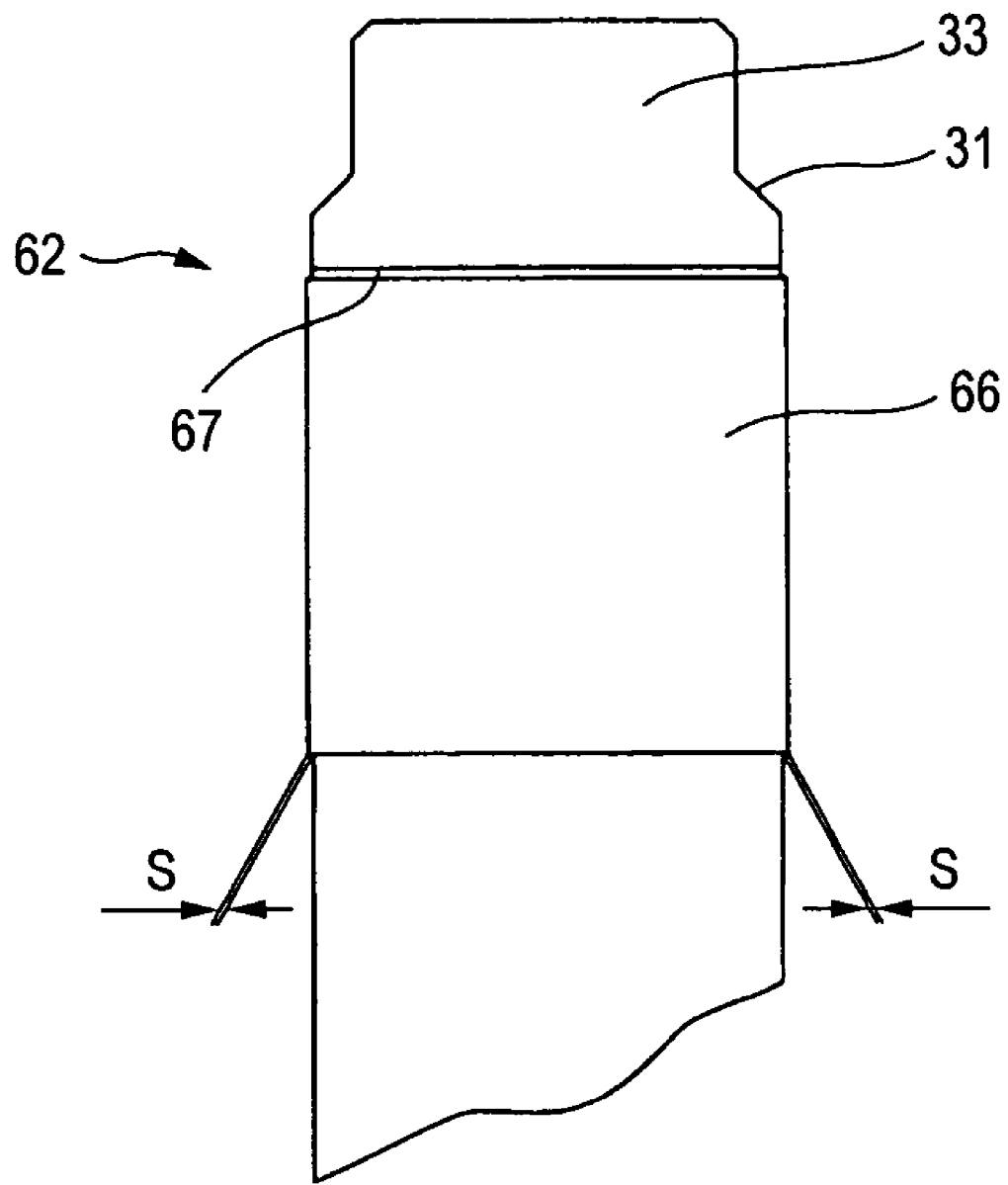
FIG. 12 is a schematic illustration showing a partial cross-section of a temporary shaft of Embodiment 2.

FIG. 11 is a sectional view showing an assembly apparatus for assembling a ball screw device of Embodiment 2, and FIG. 12 is a schematic illustration showing a partial cross-section of the temporary shaft of Embodiment 2.

In this connection, like reference characters are used to indicate like parts in Embodiments 1 and 2, and the explanations are omitted here.

The ball screw 1 of the present embodiment is the same deflector type ball screw device as that of Embodiment 1. However, a diameter of the inner circumferential face of the nut 4 is relatively small and a diameter of the steel ball 7 is formed to be relatively small.

In FIG. 11, reference numeral 61 is an assembly apparatus of assembling the ball screw device 1 described above. This assembly apparatus is an assembly apparatus for charging steel balls 7 into a circulation passage of a relatively small nut 4.

Reference numeral 62 is a temporary shaft, which is a rod-shaped member inserted into the nut 4 instead of the screw shaft 2 at the time of charging the steel balls 7 into the nut 4 made of steel material such as alloy steel. In the same manner as that of the outer cylinder 21 of Embodiment 1, the temporary shaft 62 has an outer diameter which is obtained when a predetermined gap margin is subtracted from the diameter of the inner circumferential circle which is smaller than BCD of the nut 4, which is to be assembled, by the diameter.

In the same manner as that of Embodiment 1, at a forward end portion of the temporary shaft 62, a conical face 31, which is an inclined face, and a boss portion 33 are provided. A fixed end 63 on the opposite side is engaged with the engaging hole 64 at the end portion of the shaft 19, and a cutout portion provided at the fixed end 63 is pushed and fixed by a setting screw.

Reference numeral 66 is a plate-shaped elastic body, which is a plate-shaped member made of elastic material such as natural rubber or synthetic rubber. The plate-shaped elastic body 66 has a width which is obtained when a predetermined tightening margin is subtracted from the thickness. The plate-shaped elastic body 66 is engaged with a slit 67, which penetrates the temporary shaft 62 in the radial direction, by the elasticity of the plate-shaped elastic body 66.

As shown in FIG. 12, a length of the plate-shaped elastic body 66 in the radial direction of the temporary shaft 62 is set so that protrusions S at the forward end portions of both sides can be a length by which a predetermined pushing margin can be obtained on the outside in the radial direction of the inscribed circle of the steel ball 7 charged in the nut raceway groove 5. A length of the plate-shaped elastic body 66 in the axial direction is set to be longer than the length of one lead of the nut raceway groove 5 and to be shorter than the length obtained when a diameter of the steel ball 7 is subtracted from the distance between the centers of the tongue portion 13 of the end deflector 10 attached to both end portions of the return passage 8. Further, the length of the plate-shaped elastic body 66 in the axial direction is set to be shorter than the length in the axial direction of the slit 67.

The pushing mechanism of the present embodiment is formed out of a plate-shaped elastic body 66 composed in such a manner that the plate-shaped elastic body 66 is held by the slit 67 so that it can be moved in the radial direction of the temporary shaft 62 by the elasticity and so that the foreword end portions on both sides protruding from the outer circumferential face of the temporary shaft 62 can be moved in the radial direction from the opening of the slit 67 by the elasticity.

Reference numeral 69 is a nut receiving base made of steel material such as alloy steel. A nut 4, which is an object to be assembled, is arranged in the longitudinal direction on the nut receiving base 69, which is an annular member having an arrangement hole 69a with which an outer circumferential face of the nut 4 is engaged. An engagement portion 69b, which is formed at an end portion on the opposite side to the arrangement hole 69a, is idly engaged with an attaching portion 70a of the end portion of the slider 70.

On an inner circumferential face of the attaching hole 70a in the end portion of the slider 70, a ball plunger 42, which protrudes in the radial direction, is provided, and its forward end portion pushes an outer circumferential face of the engaging portion 69b of the nut receiving base 69, so that the slider 70 and the nut receiving base 69 can be fixed to each other.

Further, a ball plunger 42 protruding in the radial direction is provided on the inner circumferential face of the arrangement hole 69a of the nut receiving base 69, and its foreword end portion pushes an outer circumferential face of the nut 4, so that the nut 4 and the nut receiving base 69 can be fixed.

An inner circumferential face of the slider 70 is idly engaged with an outer circumferential face of the support block 43 and supported so that it can be reciprocated in the axial direction with respect to the shaft 19. By a positioning device in the axial direction not shown arranged in the end portion on the opposite side of the attaching hole 70a of the nut receiving base 69, the nut receiving base 69 is supported being capable of freely elevating with respect to the support block 43. In the same manner as that of Embodiment 1, the shaft 19 is pivotally supported by the rolling bearing 44 so that it can be freely rotated with respect to the support block 43.

The ball insertion jig 50 of the present embodiment is composed in the same manner as that of the ball insertion jig of Embodiment 1. However, the entire ball insertion jig 50 of the present embodiment is downsized so that it can be fitted to the diameter of the inner circumferential face of the small nut 4.

The assembly apparatus 61 of assembling the ball screw device 1 is composed by incorporating the parts described above as follows. The rolling bearing 44 and the sealing body 45 are engaged with each other and assembled onto the inner circumferential face of the support block 43. The shaft 19 is inserted into the sealing body 45. With the inner ring of the rolling bearing 44, the shaft 19 is engaged and assembled. Onto the outer circumferential face of the support block 43, the inner circumferential face of the slider 70 is idly engaged and supported by a positioning mechanism not shown in the drawing.

Then, the fixed end 63 of the temporary shaft 62 is inserted into the engagement hole 64 of the shaft 19 and tightened and fixed with a setting screw. The temporary shaft 62 is inserted onto the inner diameter side of the nut receiving base 69. The engaging portion 69b of the nut receiving base 69 is inserted into the attaching hole 70a of the slider 70. A foreword end portion of the ball plunger 42 pushes the outer circumferential face of the engaging portion 69b of the nut receiving base 69. In this way, the assembly apparatus 61 is assembled.

While the inner diameter of the nut 4, which is an object to be assembled, is being inserted into the temporary shaft 62, the nut 4 is inserted in the longitudinal direction into the arrangement hole 69a of the nut receiving base 69 of the assembly apparatus 61 of the ball screw device 1 assembled in this way. Then, the nut 4 is pushed with a foreword end portion of the ball plunger 42 of the arrangement hole 69a. The slider 70 is elevated by a positioning mechanism not shown, and the shoulder portion 39 of the conical face 31 of the temporary shaft 62 is located at a position close to the lower portion of the opening portion to the nut raceway groove 5 of the direction change passage 12 of the end deflector 10 engaged with the upper end portion of the return passage 8 arranged in the longitudinal direction of the nut 4.

The insertion portion 51 of the ball insertion jig 50 is inserted onto the inner diameter side of the nut 4 while the positioning groove 54 is being engaged with the tongue portion 13 of the end deflector 10. The conical recess portion 51a is put on the conical face 31 of the temporary shaft 16. Into the ball introducing hole 52 of the ball insertion jig 50, the steel balls 7 to be charged into one circulation passage, the number of which is predetermined, are put by using a counting dish.

In the same manner as that of Embodiment 1, the steel balls 7, which have been put into the ball introducing hole 52, roll on the conical face 31 of the temporary shaft 62 from the opening of the ball introducing hole 52 to the shoulder portion 39. When the temporary shaft 62 is rotated in the direction of arrow C by the shaft 19, the steel balls 7 are fed by its own weight into between the outer circumferential face of the temporary shaft 62 and the nut raceway groove 5 of the nut 4.

While the steel balls 7, which have been sent into the nut raceway groove 5, are being pushed by the elasticity of the foreword end portions of both sides of the plate-shaped elastic body 66 protruded from the outer circumferential face of the temporary shaft 62, the steel balls 7 are moved in the nut raceway groove 5 and scooped up by the tongue portion 13 of the lower end deflector 10 and fed from the direction change passage 12 into the return passage 8.

At this time, by a frictional force generated by the pushing of the protruding foreword end portion of the plate-shaped elastic body 66, the steel balls 7 moving in the nut raceway groove 5 in the neighborhood of the lower end deflector 10 are pushed and moved. Therefore, in the same manner as that of Embodiment 1, the steel balls 7 in the return passage, which are longitudinally arranged, are pushed up from below, and reach the upper direction change passage 12. The leading steel ball 7 comes into contact with the engaging portion 55 of the positioning groove 54 of the ball insertion jig 50 and stops.

As described above, the steel balls 7 are charged in order into the return passage 8 and the connection passage composed of the direction change passages 12 provided at both end portions. The steel balls 7 are aligned in the nut raceway groove 5 of the nut 4. The steel balls 7, the number of which is predetermined, which are put into the ball introducing hole 52, are charged into the circulation passage.

In this case, the steel balls 7 are charged into all passages. Even when the foreword portion of the plate-shaped elastic body 66 of the pushing mechanism pushes the steel balls 7 which stop in the nut raceway groove 5, since it is composed in such a manner that the protruding foreword end portion can be moved in the radial direction from the outer circumferential face of the temporary shaft 62 by the elasticity of the plate-shaped elastic body 66, the foreword end portion of the plate-shaped elastic body 66 can be made to get over the steel ball 7 without damaging the steel ball 7. Therefore, no problems are caused in the rotation of the temporary shaft 62.

When the steel balls 7 are charged into the circulation passage of the nut 4, the ball screw device 1 is assembled as follows. The ball insertion jig 50 is removed. A sleeve not shown is engaged with the conical face 31 of the temporary shaft 62. While the sleeve is being pushed, the nut 4 is pulled up and moved to the sleeve. Instead of the sleeve, the predetermined screw shaft 2 is screwed so that the ball screw device 1 can be assembled.

As described above, in the present embodiment, while the steel balls 7, which have been fed into the nut raceway groove 5, are being pushed by the protruding foreword end portion of the plate-shaped elastic body 66 of the pushing mechanism, the steel balls 7 are smoothly moved. Therefore, while the steel balls 7 are being prevented from being obstructed, the steel balls 7 can be easily fed into the connection passage, which is arranged in the longitudinal direction, from below the nut 4 longitudinally arranged.

Actions of the guide face 56 of the ball insertion jig 50 and the positioning groove 54 are the same as those of Embodiment 1 described before. Therefore, the explanations are omitted here.

As explained above, in the present invention, the same advantages as those of Embodiment 1 described before can be provided when operation is conducted as follows. On the nut receiving base which is supported by the support block of the assembly apparatus of the ball screw device being freely elevated, the nut is arranged in the longitudinal direction. Onto the inner diameter side of the nut, the temporary shaft, which is pivotally supported by the support block, is inserted. The steel balls, the number of which is predetermined, which is put onto the conical face formed in the foreword end portion of the temporary shaft, are fed from the shoulder portion into the nut raceway groove. By the foreword end portion of the plate-shaped elastic body of the pushing mechanism which protrudes in the radial direction from the outer circumferential face of the temporary shaft by the elasticity of the plate-shaped elastic body, the steel balls, which have been fed into the nut raceway groove, are pushed. In this way, the same advantages as those of Embodiment 1 described before can be provided.

In this connection, in the assembly apparatus of each embodiment explained above, the steel balls are fed into the nut raceway groove by its own weight. However, when the balls are fed into the nut raceway groove from the shoulder portion of the conical face of the temporary shaft, negative pressure may be given to a gap formed between the shoulder portion of the conical face and the inner circumferential face of the nut. In this case, a suction port is open on the side wall of the slider, and a space, which is defined by the inner circumferential face of the slider, the nut receiving base, the temporary shaft, the shaft, the support block and the sealing body, may be made to function as a negative pressure chamber.

Due to the above structure, the steel balls, which have been sucked by the negative pressure, are smoothly fed into the nut raceway groove by a frictional force generated together with the shoulder portion when the temporary shaft is rotated. Therefore, even when the steel balls of a small diameter are charged into the circulation passage and its own weight is light, it is possible to prevent the steel balls from being obstructed.

In the above explanation of each embodiment, the ball screw device having the longitudinally arranged passage is of the deflector type. However, the present invention is not limited to the ball screw device having the longitudinally arranged passage. The ball screw device having the longitudinally arranged passage may be of the end cap type ball screw device. Even in this case, it is possible to smoothly feed the steel balls into the connection passage of the longitudinally arrangement type. Therefore, the same advantages as those of each embodiment described before can be provided.

Further, when the present invention is applied to a ball screw device having a top type connection passage, the steel balls can be moved while being pushed by the protruding foreword end portion of the pushing mechanism. Therefore, even when the lead of the nut raceway groove is small, the steel balls can be smoothly charged into the circulation passage.

Furthermore, in the above embodiments, one nut raceway groove is provided. However, in the case where multiple nut raceway grooves are provided, the circumstances are the same. In this case, a plurality of ball introducing holes of the ball insertion jig may be provided according to the number of the nut raceway grooves. In this way, the steel balls can be simultaneously charged into the nut having multiple raceway grooves. Accordingly, it is possible to reduce a working time of charging the steel balls into the nut having multiple nut raceway grooves.

In each embodiment explained above, the balls are steel balls. However, the balls are not limited to the steel balls. The balls may be balls made of ceramic material or resin material.

In each embodiment explained above, when the screw shaft is screwed into the nut through the steel balls, the nut is once transferred to the sleeve, and then the nut is screwed to the screw shaft. However, according to the shape of the end portion of the screw shaft, the conical protrusion and the chamfering of the temporary shaft may be formed. While the nut is being rotated, the nut may be directly screwed to the screw shaft. Due to this constitution, the assembling efficiency of assembling the ball screw device can be enhanced.

In each embodiment described above, the screw shaft of the ball screw device is rotated so as to move the nut in the axial direction. However, when a ball screw device, in which the screw shaft is moved in the axial direction by rotating the nut, is applied to the present invention, the same advantages can be provided.

Embodiment 3

Next, referring the drawings, a third embodiment of the assembly device of assembling a ball screw device of the present invention will be explained as follows.

Figure 13:
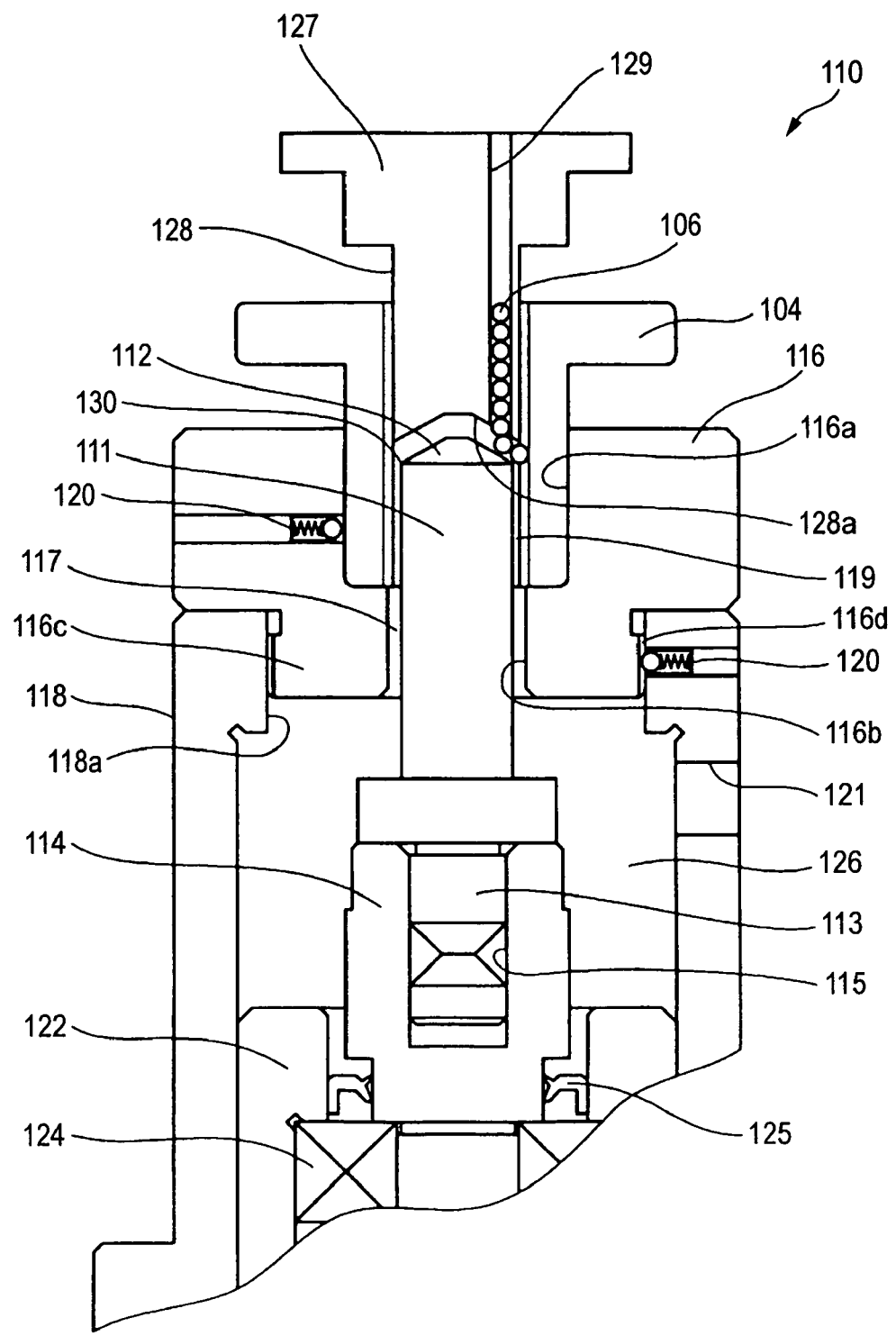
FIG. 13 is a sectional view showing an assembly device for assembling a ball screw device of the Embodiment 3.
Figure 14:
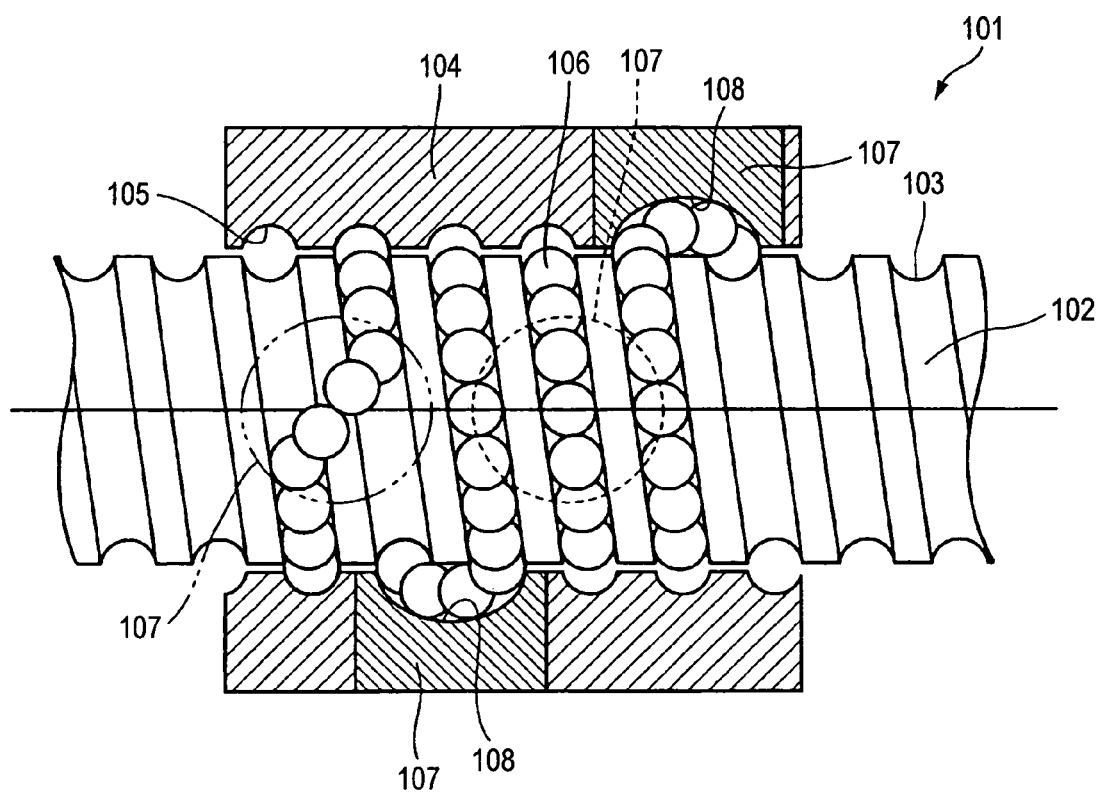
FIG. 14 is a sectional view showing the ball screw device of Embodiment 3.
Figure 15:
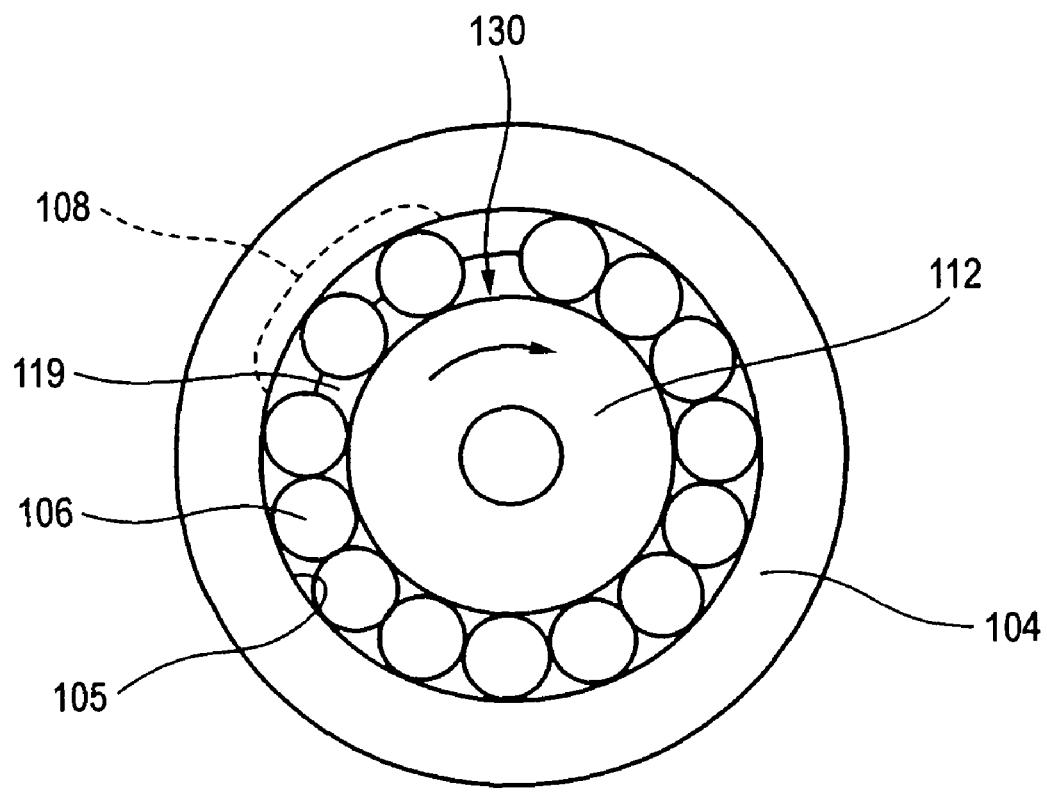
FIG. 15 is a schematic illustration showing a state in which balls are charged into the assembly device of Embodiment 3.

FIG. 13 is a sectional view showing an assembly device for assembling a ball screw device of the third embodiment, FIG. 14 is a sectional view showing the ball screw device of the embodiment, and FIG. 15 is a schematic illustration showing a state in which balls are charged into the assembly device of the embodiment.

In this connection, FIG. 15 is a sectional view of a portion of a nut to which a top portion is attached, wherein this view is taken when the portion is cut away in a direction perpendicular to the axis of the nut. In FIG. 14, reference numeral 101 is a ball screw device. In this embodiment, the ball screw device 101 is a top type ball screw device.

Reference numeral 102 is a screw shaft of the ball screw device 101, which is a rod-shaped member made of alloy steel. On the outer circumferential face, a shaft raceway track groove 103, the shape of which is a substantial semicircle, is spirally formed by a predetermined lead.

Reference numeral 104 is a nut of the ball screw device 101, which is a cylindrical member made of steel such as alloy steel. On the inner circumferential face of the nut 104, a nut raceway track groove 105, the shape of which is a substantial semicircle, which is opposed to the shaft raceway track groove 103, is formed by the same lead as that of the shaft raceway track groove 103.

Reference numeral 106 is a steel ball, which is a spherical body made of steel such as alloy steel. A plurality of steel balls 106 are charged into between the shaft raceway track groove 103 and the nut raceway track groove 105 so that the screw shaft 102 can be screwed to the nut 104.

Reference numeral 107 is a top portion. The top portion 107 is a plug-shaped member made of steel for connecting two adjoining nut raceway track grooves, having a connection passage 108, the cross section of which is arcuate, which is a groove curved into an S-shape. A plurality of top portions 107 are attached to a plurality of holes provided on the cylindrical wall of the nut 104 while the angular positions in the circumferential direction are being shifted from each other.

The circulation passage is formed out of the shaft raceway track groove 103 of the screw shaft 102, the nut raceway track groove 105 opposed to the shaft raceway track groove 103 and the connecting passage 108 of the top portion 107 for connecting the shaft raceway track groove 103 with the nut raceway track groove 105. Into this circulation passage, a plurality of steel balls 106 and a predetermined quantity of lubricant, for example, grease are enclosed.

Due to the above structure, the shaft raceway track groove 103 and the nut raceway track groove 105 are screwed to each other through the steel balls 106. When the screw shaft 102 is rotated, the nut 104 can be moved in the axial direction while the steel balls 106 are circulating in the circulation passage.

Explanations will be made into an assembly device for charging the steel balls 106 into the nut 104 of the above ball screw device 101.

In FIG. 13, reference numeral 110 is an assembly device of assembling the ball screw device 101.

The nut 104 of the ball screw device 101, which is an object to be assembled, is a nut in which a plurality of top portions 107 are arranged in the circumferential direction. This nut 104 is fixed to a moving body of a mechanical device by a flange portion provided in an outer circumferential portion of the nut 104.

Reference numeral 111 is a temporary shaft which is a rod-shaped member, which is made of steel material such as alloy steel, inserted onto the inner diameter side of the nut 104 instead of the screw shaft 102 at the time of charging the steel balls 106 into the nut 104. An outer diameter of the temporary shaft 111 is determined in such a manner that a predetermined gap margin is subtracted from the diameter of the inner circumferential circle which is smaller than BCD (ball center diameter) of the nut 104 to be assembled by the diameter of the steel ball 106, that is, a predetermined gap margin is subtracted from the diameter of an inscribed circle of the steel ball 106 circulating in the circulation passage.

At the foreword end portion of the temporary shaft 111, a conical protrusion 112 having a conical face, which is an inclined face, is provided. A fixed end 113 on the opposite side is engaged with the engagement hole 115 provided at the end portion of a shaft 114. A cutout portion provided at the fixed end 113 is pushed with and fixed by a setting screw.

In this connection, an inclined face provided at the foreword end portion of the temporary shaft 111 is not limited to the above specific inclined face. The inclined face may be a combination in which a conical face and a polygonal face are combined with each other.

Reference numeral 116 is a nut receiving base made of steel material such as alloy steel. A nut 104, which is an object to be assembled, is arranged in the longitudinal direction in the nut receiving base 116, which is a annular member having an arrangement hole 116a with which an outer circumferential face of the nut 104 is engaged. At the central portion of the nut receiving base 116, a through-hole 116b, which forms a gap 117 between the outer diameter of the temporary shaft 111 and the through-hole 116b itself, is formed. An engagement portion 116c, which is formed at an end portion on the opposite side to the arrangement hole 116a, is engaged with an attaching hole 118a of the end portion of a slider 118.

The gap 117 formed between the through-hole 116b and the outer diameter of the temporary shaft 111 is connected with a gap 119 formed between the outer circumferential face of the temporary shaft 111 and the inner circumferential face of the nut 104.

Further, on the outer circumferential face of the engaging portion 116c of the nut receiving base 116, a plurality of dividing grooves 116d are formed which are V-shaped grooves formed according to the angular positions of a plurality of connection passages formed on the nut 104 in the axial direction. A foreword end portion of a ball plunger 120 which is a positioning member protruding in the radial direction on the inner circumferential face of the attaching hole 118a of the end portion of the slider 118 engages with the dividing groove 116d and functions as an angle dividing mechanism used when the balls 106 are charged into a plurality of circulation passages of the nut 104.

In the arrangement hole 116a of the nut receiving base 116, a ball plunger 120, which protrudes in the radial direction, is provided on the inner circumferential face. A foreword end portion of the ball plunger 120 pushes an outer circumferential face of the nut 104. Therefore, the nut 104 and the nut receiving base 116 are synchronously rotated.

Reference numeral 121 is a suction port, which is formed penetrating the cylindrical side wall of the slider 118. A suction port 121 is connected to a vacuum generating device such as a vacuum pump with a tube and others.

Reference numeral 122 is a support block, which is a cylindrical member made of steel material such as alloy steel. An outer circumferential face of a support block 122 is idly engaged with an inner circumferential face of the slider 118. Therefore, the support block 122 supports the slider 118 so that the slider 118 can be reciprocated in the axial direction.

In the slider 118, a positioning mechanism not shown to conduct positioning in the axial direction is provided at an end portion on the opposite side of the nut receiving base 116. The slider 118 supports the nut receiving base 116 so that the nut receiving base 116 can be freely elevated with respect to the support block 122.

Reference numeral 124 is a rolling bearing such as a ball bearing, the inner ring of which is engaged with the shaft 114 and the outer ring of which is engaged with the inner circumferential face of the support block 122. Therefore, the rolling bearing 124 pivotally supports the shaft 114 with respect to the support block 122.

Reference numeral 125 is a sealing body, which is an annular member made of elastic material such as natural rubber or synthetic resin. An outer circumferential face of the sealing body 125 is engaged with the support block 122 so that the sealing body 125 can be fixed. A lip portion provided on an inner circumferential face of the sealing body 125 comes into slide contact with the outer circumferential face of the shaft 114. Therefore, the sealing body 125 functions as a contact type seal.

Reference numeral 126 is a negative pressure chamber. The negative pressure chamber 126 is formed in a space partitioned by the inner circumferential face of the slider 118, the nut receiving base 116, the temporary shaft 111, the shaft 114, the support block 122 and the sealing body 125. At the time of assembling the ball screw device 101, air is sucked from the negative pressure chamber 126 through the suction port 121. Therefore, negative pressure is supplied into the gap 119 formed by the outer circumferential face of the temporary shaft 111 and the inner circumferential face of the nut 104 through the gap 117.

Reference numeral 127 is a ball insertion jig. The ball insertion jig 127 includes an insertion portion 128, the outer diameter of which is a value obtained when a predetermined gap margin is subtracted from the diameter of the inner circumferential face of the nut 104. On an end face of the insertion portion 128, a conical recess portion 128a is formed which includes the same conical face as the conical protrusion 112 arranged being opposed to the conical protrusion 112 of the temporary shaft 111. The ball insertion jig 127 includes a ball introducing hole 129 which penetrates the ball insertion jig 127 itself in the axial direction from the upper face 127a to the conical recess portion 128a.

The assembly device 110 of assembling the ball screw 101 is assembled when the parts described above are incorporated as follows. The rolling bearing 124 and the sealing body 125 are engaged with each other and incorporated onto the inner circumferential face of the support block 122. The shaft 114 is inserted into the sealing body 125. The shaft 114 is engaged with and incorporated into the inner ring of the rolling bearing 124. The inner circumferential face of the slider 118 is idly engaged with the outer circumferential face of the support block 122 and supported by a positioning mechanism not shown in the drawing.

Then, the assembly device 110 is assembled as follows. The fixed end portion 113 of the temporary shaft 111 is inserted into the shaft 114 and tightened and fixed with a setting screw. The temporary shaft 111 is inserted into the through-hole 116b of the nut receiving base 116. The engaging portion 116c of the nut receiving base 116 is inserted into the attaching hole 118a of the slider 118. A foreword end portion of the ball plunger of the attaching hole 118a is engaged with the dividing groove 116d. In this way, the assembly device 110 is assembled.

While the inner diameter side of the nut 104, which is an object to be assembled, is being inserted into the temporary shaft 111 and the nut 104 is being inserted into the arrangement hole 116a of the nut receiving base 116 of the assembly device 110 of the ball screw device 101 assembled in this way, the nut 104 is inserted in the longitudinal direction. Then, the nut 104 is pushed with a foreword end portion of the ball plunger 120 of the arrangement hole 116a. The slider 118 is elevated by a positioning mechanism not shown. A corner portion (a shoulder portion) between the conical face of the conical protrusion 112 of the temporary shaft 111 and the outer circumferential face of the temporary shaft is positioned in the neighborhood of the lower portion of the upper opening portion to the nut raceway track groove 105 of the connecting passage 108 of the lowermost top portion 107 of the nut 104.

Then, the insertion portion 128 of the ball insertion jig 127 is inserted into the nut 104. An interval between the conical face of the conical recess portion 128a and the conical face of the conical protrusion 112 of the temporary shaft 111 is made to be larger than the diameter of the steel ball 106 to be incorporated into the nut 104 which is an object to be assembled. The ball insertion jig 127 is assembled so that an outlet of the ball introducing hole 129 can be directed in the angle direction of the upper opening portion to the nut raceway track groove 105 of the connection passage 108 of the lowermost top portion 107 of the nut 104. A predetermined number of steel balls 106, which are charged into one circulation passage, are charged into the ball introducing hole 129 of the ball insertion jig 127 with a counting dish. At the same time, a vacuum generating device not shown is operated so as to maintain the negative pressure chamber in a state of negative pressure.

The steel balls 106, which have been put into the ball introducing hole 129, are thrown from the opening of the ball introducing hole 129 of the conical recess portion 128*a* onto the conical protrusion 112. Then, the steel balls 106 roll on the conical face of the conical protrusion 112 and collect round a shoulder portion 130 of the temporary shaft 111 as shown in FIG. 15. When the temporary shaft 111 is rotated by the shaft 114 supported by the rolling bearing 124, the steel balls 106 are fed into between the outer circumferential face of the temporary shaft 111 and the nut raceway track groove 105 of the nut 104.

At this time, through the gap 117 formed between the outer circumferential face of the temporary shaft 111 and the through-hole 116*b* of the nut receiving base 116, negative pressure is supplied from the negative pressure chamber 126 into the gap 119 formed between the outer circumferential face of the temporary shaft 111 and the inner circumferential face of the nut 104. By the negative pressure supplied into the gap 119, the steel balls 106, which have collected round the shoulder portion 130 of the temporary shaft 111, are sucked downward. Therefore, the steel balls 106 can be stably held in the gap formed between the shoulder portion 130 of the temporary shaft 111 and the inner circumferential face of the nut 104. At the same time, the steel balls 106 are pushed to the shoulder portion 130 of the temporary shaft 111. Therefore, a frictional force generated between these components is increased. Accordingly, by the rotation of the temporary shaft 111, a predetermined number of steel balls 106 can be smoothly fed into the circulation passage in the nut 104. Accordingly, the steel balls 106 are aligned in order between the nut raceway track groove 105 and the outer circumferential face of the temporary shaft 111 from the start point of the lower opening portion of the nut raceway track groove 105 of the connecting passage 108.

This holding of the steel balls 106 by the negative pressure is effective especially when the dead weight of the steel balls is light.

That is, when the dead weight of the steel balls is light, at the time of feeding the steel balls into the circulation passage only by the dead weight, the steel balls 106 are pushed into the connecting passage 108 of the top portion 107 in some cases, that is, it is impossible to feed the steel balls into the circulation passage in a stable state. However, when the steel balls 106 are held round the shoulder portion 130 of the temporary shaft 111 by the negative pressure as described in the present embodiment, the steel balls 106, which have collected in the shoulder portion 130, can be smoothly fed into the circulation passage.

In this case, the steel balls 106 are charged into all circulation passages of the nut 104 as follows. When the steel balls 106 are charged into the lowermost circulation passage of the nut 104, the slider 118 is lowered by a positioning device not shown. The shoulder portion 130 of the temporary shaft 111 is positioned in a portion close to the lower end portion of the upper opening portion of the connecting passage 108 of the top portion 107 arranged in an upper portion of the nut by one. The nut receiving base 116 is rotated, and a foreword end portion of the ball plunger of the attaching hole 118*a* is engaged with the next dividing groove 116*d* of the not receiving base 116. An angular direction of the upper opening portion of the connecting passage 108 of the top portion 107 of the nut 104 rotating synchronously with the nut receiving base 116 is arranged being directed to the outlet of the ball introducing hole 129 of the ball insertion jig 127. In the same manner as that described above, while the steel balls 106 are being sucked, the steel balls 106 are charged into the circulation passage. This operation is successively repeated so as to charge the steel balls 106 from the lower circulation passage to the upper circulation passage. In this way, the steel balls 106 are charged into all circulation passages of the nut 104.

After that, the ball insertion jig 127 is removed. The sleeve not shown is engaged with the conical protrusion 112 of the temporary shaft 111. While the sleeve is being pushed, the nut 104 is pulled up and transferred to the sleeve. Instead of the sleeve, a predetermined screw shaft 102 is screwed to the nut 104. In this way, the ball screw device 101 is assembled.

As described above, in the present embodiment, the steel balls 106, which have been collected in the shoulder portion 130 of the temporary shaft 111, are held between the shoulder portion 130 and the inner circumferential face of the nut 104 by the action of negative pressure. The steel balls 106 are fed into the circulation passage of the nut 104 by rotating the temporary shaft 111. Therefore, the steel balls 106, which have collected round the shoulder portion 130 of the temporary shaft 111, are sucked downward. Accordingly, the steel balls 106 are held by the shoulder portion 130 of the temporary shaft 111 in a stable state, and a frictional force generated between the steel balls 106, which are pushed to the shoulder portion 130 of the temporary shaft 111, and the shoulder portion 130 is increased. Therefore, the steel balls 106 can be easily fed into the passage of the nut 104 by the rotation of the temporary shaft 111.

The aforementioned matter is effective when the steel balls are prevented from being blocked especially in the case where the dead weight of the steel balls is light or the lead of the nut raceway track groove 105 is small.

Since the steel balls 106 are sucked and smoothly fed into the circulation passage of the nut 104, it becomes unnecessary to push the steel balls 106 into the circulation passage with the insertion rod and others. Accordingly, there is no possibility that the steel balls 106 are damaged.

Further, by the angle dividing mechanism in which the ball plunger 120 arranged in the attaching hole 118*a* of the slider 118 is engaged with the dividing groove 116*d* provided on the nut receiving base 116, an angular direction of the upper opening portion to the nut raceway track groove 105 of the connecting passage 108 of the top portion 107 of the nut 104 is made to agree with the direction of the outlet of the ball introducing hole 129 of the ball insertion jig 127. Therefore, the angular positions of the ball insertion jig 127 and the nut 104 can be easily divided.

Further, the nut 104, which has been arranged on the nut receiving base 116, is arranged by dividing an angular position of the ball insertion jig 127 with respect to the nut 104 by the angle dividing mechanism. A predetermined number of steel balls 106 are put onto the conical protrusion 112 of the temporary shaft 111. Only when the temporary shaft 111 is rotated while the negative pressure is being supplied, the steel balls 106 can be easily charged into the nut 104. Therefore, it is possible to shorten the working time for charging the steel balls.

As explained above, in the present embodiment, the nut is arranged in the longitudinal direction on the nut receiving base which is supported by the support block of the assembly device for assembling the ball screw device being capable of freely elevating. The temporary shaft pivotally supported by the support block is inserted onto the inner diameter side of the nut, and the negative pressure is supplied from the negative pressure chamber into the gap formed between the shoulder portion of the conical protrusion of the temporary shaft and the inner circumferential face of the nut. Due to the foregoing, the steel balls are collected to the shoulder portion of the temporary shaft by the conical protrusion provided on the temporary shaft. The steel balls sucked and held by the negative pressure can be smoothly fed into the nut raceway track groove by utilizing a frictional force generated between the steel balls and the shoulder portion when the temporary shaft is rotated. Therefore, even when the lead of the nut raceway track groove is small and the diameter of the steel ball to be charged into the circulation passage is small and the dead weight is light, it is possible to prevent the steel balls from being blocked in the circulation passage and further it is possible to prevent the steel balls from being damaged.

In the embodiment explained above, the balls are the steel balls. However, the balls are not limited to the steel balls. The balls may be light balls made of ceramic material or resin material. When the present invention is applied to the balls made of the aforementioned material, the same effect as that of the present invention can be provided.

In the embodiment explained above, a suction port of the negative pressure chamber is open on the side wall of the slider, and the negative pressure chamber is a space partitioned by the inner circumferential face of the slider, the nut receiving base, the temporary shaft, the shaft, the support block and the sealing body. However, it should be noted that the negative pressure chamber is not limited to the above specific structure. As long as it is a negative pressure chamber capable of supplying negative pressure into the gap between the shoulder portion of the conical protrusion and the inner circumferential face of the nut, any structure of the negative pressure chamber may be adopted.

In the embodiment explained above, a cross-section of the dividing groove is formed into a V-shape. However, the cross-section of the dividing groove is not limited to the above specific shape. The cross-section of the dividing groove may be rectangular, trapezoidal or arcuate.

In the embodiment explained above, when the screw shaft is screwed to the nut through the steel balls, after the nut has been once transferred to the sleeve, the nut is screwed to the screw shaft. However, when the conical protrusion of the temporary shaft and the chamfered face are formed in accordance with the shape of the end of the screw shaft and while the nut is being rotated, the nut may be directly screwed to the screw shaft. Due to this structure, the assembling efficiency of assembling the ball screw device can be enhanced.

In the embodiment explained above, the nut is moved in the axial direction by rotating the screw shaft of the ball screw device. However, even when the present invention is applied to a ball screw device in which the screw shaft is moved in the axial direction by rotating the nut, the same effect can be provided.

Embodiments 4 and 5

Referring to the drawings, embodiments 4 and 5 of the parts supply device of the present invention will be explained below.

Embodiment 4

First, fourth embodiment of the invention will be explained.

Figure 16:
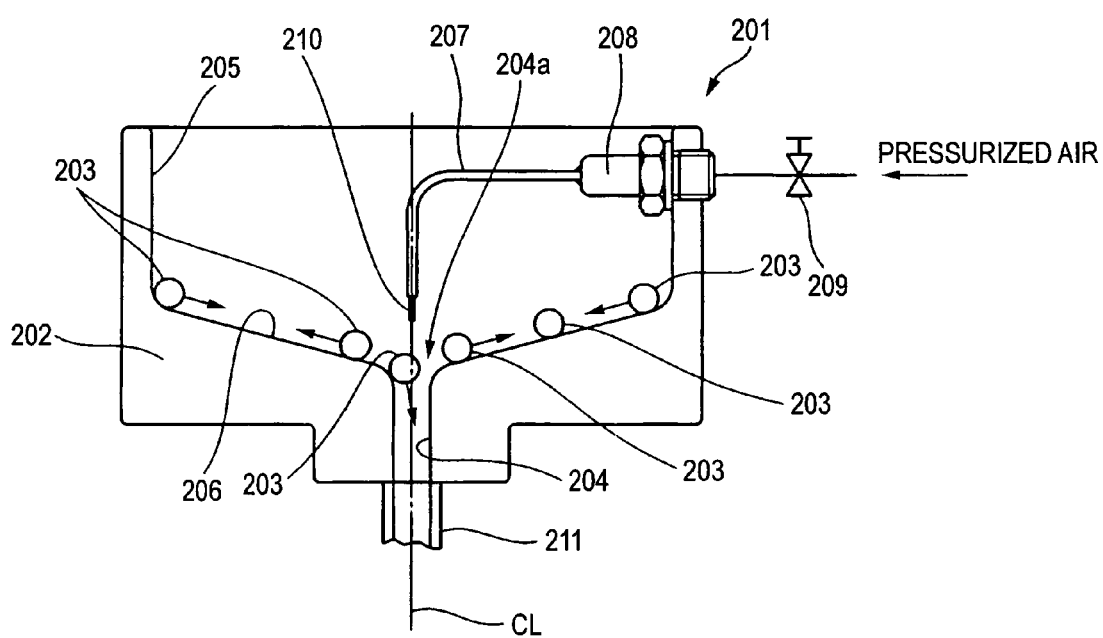
FIG. 16 is a sectional view showing a parts supply device of Embodiment 4.

FIG. 16 is a sectional view showing a parts supply device of Embodiment 4. In FIG. 16, reference numeral 201 is a parts supply device. The parts supply device 201 of the present embodiment is suitable for spheres of a relatively small dead weight.

Reference numeral 202 is a hopper of the parts supply device 201. The hopper 202 is a funnel member into which steel balls 203, which are spheres, are put. At the center of the bottom portion of the hopper 202, a delivery hole 204, the diameter of which is determined so that the steel ball 203 can pass in the hole 204, is formed in the axial direction of the hopper 202. A bottom face of the cylindrical portion 205 of the hopper 202 is decreased in the axial direction of the hopper 202 and formed into an inclined face 206 to be connected to the delivery hole 204.

Reference numeral 207 is an air nozzle, which is formed by bending a pipe and others. The air nozzle 207 is attached to the cylindrical portion 205 of the hopper 202 by an attaching fitting 208. The air nozzle 207 injects pressurized air, which is supplied from a pressurized air supply device not shown, from an injection hole 210 provided at a foreword end portion of the air nozzle 207 toward an opening 204a on the inclined face 206 side of the delivery hole 204.

The initial pressure of the pressurized air supplied from the pressurized air supply device of the present embodiment is 3 to 4 kg/cm$^2$.

Reference numeral 211 is a delivery tube communicated with the delivery hole 204. The tube 211 leads the steel balls 203, which have been delivered from the delivery hole 204, to an assembly device not shown.

The air nozzle 207 is arranged in such a manner that the injection hole 210 is opposed to the opening 204a of the delivery hole 204 and that the axial center of the injection hole 210 and the axial center CL of the delivery hole 204 are made to agree with each other. An inner diameter of the injection hole 210 is determined so that it can be not more than ½ of the diameter of the steel ball 203 which is an object to be supplied. An attaching height of attaching the injection hole 210 is determined so that the attaching height can be not more than a height at which a diameter of a jet of air injected from the injection hole 210 is expanded and becomes the same diameter as that of the opening 204a of the delivery hole 204, and the attaching height of attaching the injection hole 210 is determined so that the attaching height can be not less than a height at which the steel ball 203 rolling on the inclined face 206 by the dead weight is not contacted with the injection hole 210.

Actions of the above structure will be explained below.

In the case where the steel balls 203 are supplied by the parts supply device 201 of the present embodiment, pressurized air is supplied to the air nozzle 207. In this case, a flow rate of air is adjusted by a flow rate adjustment valve 209 at a value so that the steel ball 203 can not bound back when the steel ball 203 rolling on the inclined face by the dead weight comes into contact with a jet of air which is injected from the injection hole 210.

When the steel balls 203 to be supplied are put into the hopper 202, the steel balls 203 roll on the inclined face 206 by the dead weight and reach the jet of air which is being injected from the injection hole 210.

At this time, since the axial center of the injection hole 210 of the air nozzle 207 is attached so that it can be made to agree with the axial center CL of the delivery hole 204, the steel ball 203 (the previous steel ball 203), which has first arrived at the jet current, enters the jet current and pushed by the jet current from the opening 204a of the delivery hole 204 and passes through the delivery hole 204. Then the steel ball 203 is guided by the delivery tube 211, which is communicated with the delivery hole 204, to an assembly device not shown in the drawing.

The steel ball 203 (the next steel ball 203), which has arrived at the neighborhood of the opening 204a of the delivery hole 204 after the previous steel ball 203 arrived, is pushed back outward in the radial direction of the hopper 202 on the inclined face 206 by a jet current, which has diffused by the collision with the previous steel ball 203, and by a jet current which has leaked out when the previous steel ball 203 closes the delivery hole 204. In this case, these jet currents are referred to as a diffusion current. The next steel ball 203 is stopped when an intensity of the jet current becomes weak and a pushing force generated by the diffusion current is balanced with a component force of the dead weight caused by the inclined face 206. When the previous steel ball 203 has been delivered and the diffusion current has disappeared, the next steel ball 203 rolls on the inclined face 206 by its dead weight and reaches the jet current which is being injected from the injection hole 210. The steel ball 203, which has first arrived, is successively delivered out from the delivery hole 204 in the same manner as that of the previous steel ball 203.

As described above, in the parts supply device of the present embodiment, the diffusion current, which has been formed by the previous steel ball 203, pushes back the next steel ball 203. Accordingly, there is no possibility that the steel balls 203 are concentrated on the opening 204a of the delivery hole 204. Therefore, the steel balls are not blocked in the opening 204a of the delivery hole 204.

Further, when a flow rate of air is once adjusted, even if a production lot is changed, it is unnecessary to make an adjustment again when the steel balls 203 are delivered from the delivery hole 204.

Further, at the time of a preparatory work in which a diameter of the steel ball 203 is changed, since the air nozzle 207 can be maintained being attached to the cylindrical portion 205 of the hopper 202, it is possible to attach the air nozzle 207, the attaching position of which is adjusted to the hopper 202, the hole diameter of the delivery hole 204 of which is fitted to the diameter of the steel ball 203 frequently used. Therefore, even when a highly accurate adjustment work is not conducted, it is possible to obtain a parts supply device 201 to be used in the case where the diameter of the steel ball 203 is changed.

In this connection, the inner diameter of the air injection hole 210 is set at a value not more than ½ of the diameter of the steel ball 203 which is an object to be supplied. However, it is preferable that the inner diameter of the air injection hole 210 is set as small as possible as long as it can be balanced with the flow rate of air.

As explained above, in the present embodiment, the delivering hole for delivering the spheres is provided on the bottom portion of the funnel-shaped hopper having the inclined face decreased in the axial direction. The air injection hole of the air nozzle is arranged being opposed to the opening of the delivery hole. The axial center of the delivery hole and that of the injection hole of the air nozzle are arranged so that they can be made to agree with each other. Due to the above structure, the sphere, which has been put into the hopper, can be pushed into the delivery hole by a jet of air from the injection hole. At the same time, by the diffusion current generated by this sphere, the other sphere can be pushed back to the outside in the radial direction of the hopper. Accordingly, it is possible to prevent the spheres, which are rolling on the inclined face by the dead weight, from concentrating on the opening of the delivery hole. Therefore, it is possible to prevent the spheres from being blocked. As a result, it is possible to provide an advantage that the spheres, which have been put into the hopper, can be smoothly delivered from the delivery hole.

Embodiment 5

Next, fifth embodiment of the invention will be described.

Figure 18:
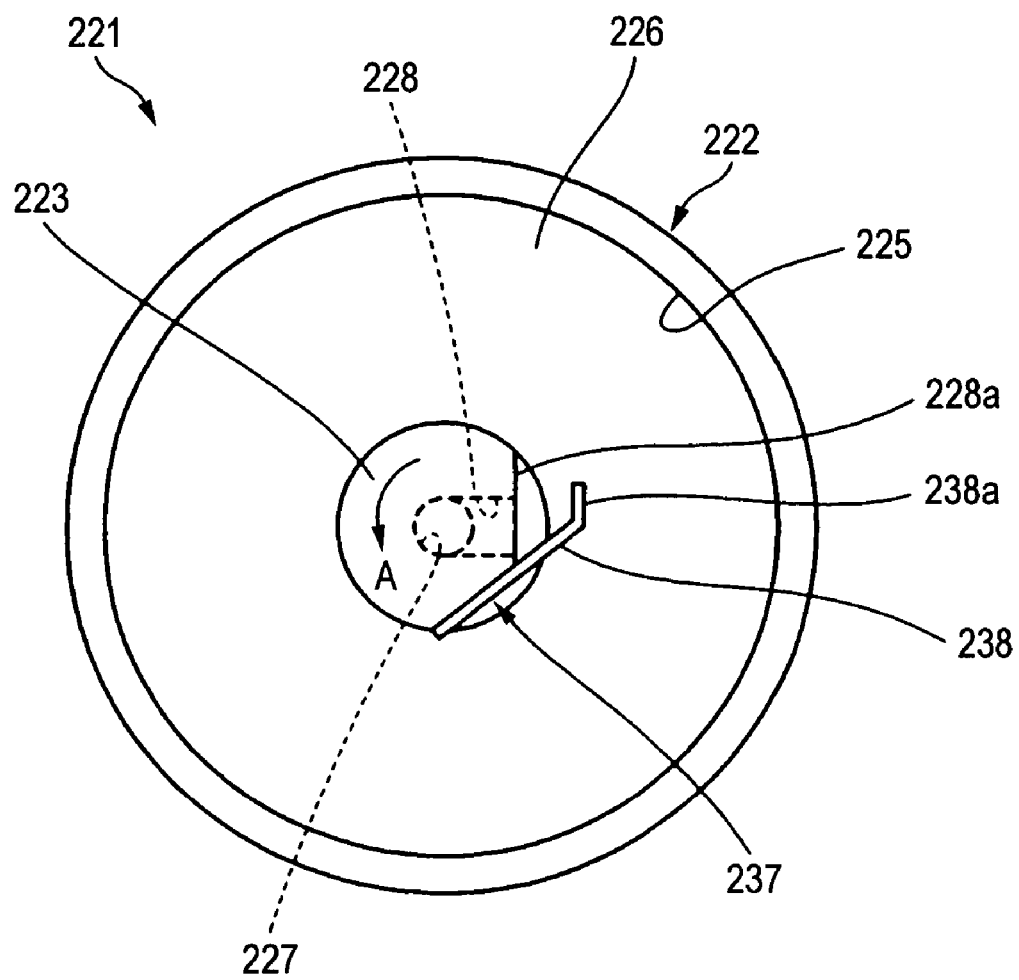
FIG. 18 is an upper face view showing the parts supply device of Embodiment 5.

FIG. 2 is a sectional view showing a parts supply device of Embodiment 5. FIG. 18 is an upper face view showing the parts supply device of Embodiment 5.

In this connection, like reference characters are used to indicate like parts in Embodiments 4 and 5, and the explanations are omitted here.

Figure 17:
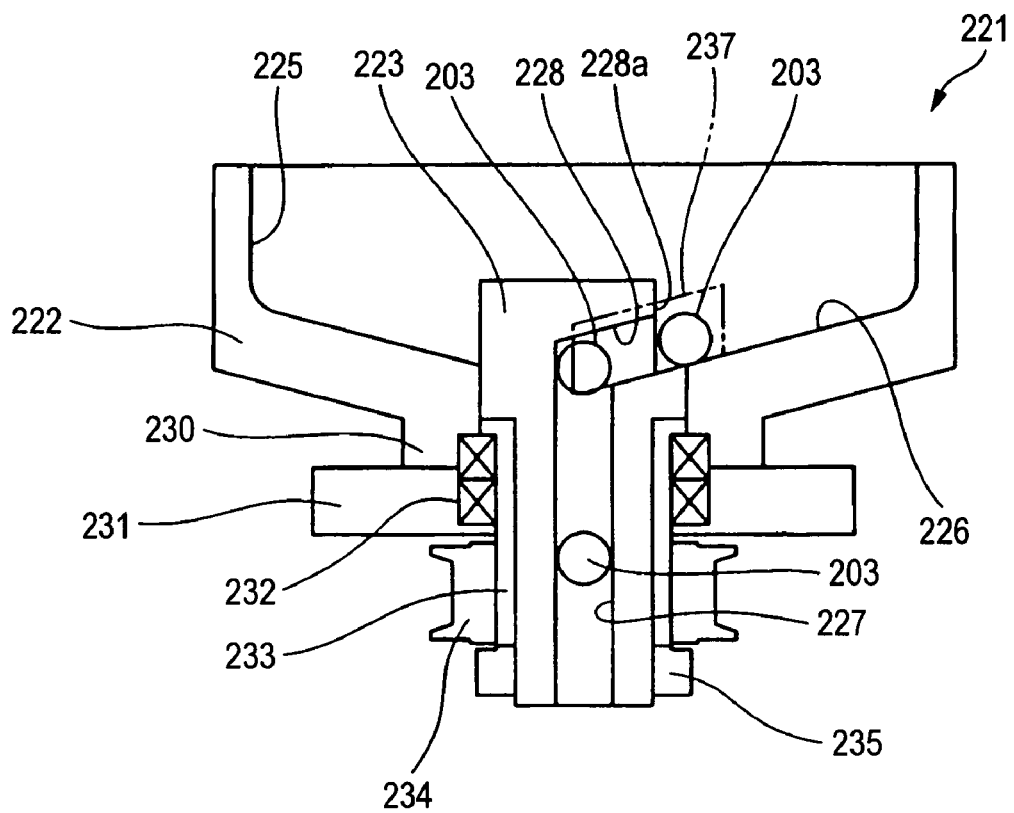
FIG. 17 is a sectional view showing a parts supply device of Embodiment 5.

In FIG. 17, reference numeral 221 is a parts supply device. The parts supply device of the present embodiment is suitable for a sphere, the dead weight of which is relatively large.

Reference numeral 222 is a hopper of the parts supply device 221, which is a funnel-shaped member into which steel balls 203, which are spheres, are put. At the center of the bottom portion of the hopper 222, an engagement hole 224, with which a rotary shaft 223 is idly engaged, is formed in the axial direction of the hopper 222. A bottom face of a cylindrical portion 225 of the hopper 222 is decreased in the axial direction of the hopper 222 and formed into an inclined face 226 coming into contact with an engagement hole 224.

A rotary shaft 223 is a stepped shaft. Along the axial center of the rotary shaft 223, a delivery hole 227, the diameter of which is determined so that the steel ball 203 can pass through from the small diameter side to the large diameter side, is formed as a bag hole. In the large diameter portion, an introduction hole 228, the diameter of which is the same as that of the delivery hole 227, which is communicated from the outer circumferential face to the delivery hole 227, is formed by the same inclination angle as that of the inclined face 226.

The small diameter portion of the rotary shaft 223 is pivotally supported by a rolling bearing 232 such as a ball bearing, which is engaged with inner circumferential faces of an attaching portion 230 and an attaching base 231 of the hopper 222, through a collar 233. The small diameter portion of the rotary shaft 223 is driven being rotated by a synchronous pulley 234, which is attached to an outer circumferential face of the collar 233, through a synchronous belt (not shown).

The collar 233 is fixed being tightened by a tightening nut 235 between the tightening nut 235, which is screwed to a screw portion formed in the end portion of the small diameter portion of the rotary shaft 223, and the step portion of the large diameter portion of the rotary shaft 223.

In FIG. 18, reference numeral 237 is a leading plate. On a plane (an opening face 228a) onto which an introducing hole 228 is open which is formed in such a manner that an outer circumferential face of the large diameter portion of the rotary shaft 223 is cut away in a direction perpendicular to the axial direction of the introducing hole 228, the leading plate 237 is arranged on an upstream side in the rotary direction of the rotary shaft 223 shown by arrow A in FIG. 18. On the leading plate 237, a guide portion 238, which extends toward the downstream in the rotary direction, is arranged.

A forward end portion 138a of the guide portion 238 of the leading plate 237 is bent in parallel with the opening face 228a. An interval between the forward end portion 138a of the guide portion 238 and an open face 228a is set in such a manner that the interval is larger than the diameter of the steel ball 203, which is an object to be supplied, and smaller than 1.5 times of the diameter of the steel ball 203. As shown by the two-dotted chain line in FIG. 17, the height of the leading plate 237 is set at a value higher than the radius of the steel ball 203. It is preferable that the height of the leading plate 237 is set at a value not less than the diameter of the steel ball 203.

An introducing hole 228 open onto the opening face 228a is formed in such a manner that its lower end is the same height as that of the inclined face 226.

Actions of the above constitution will be explained below.

Figure 19:
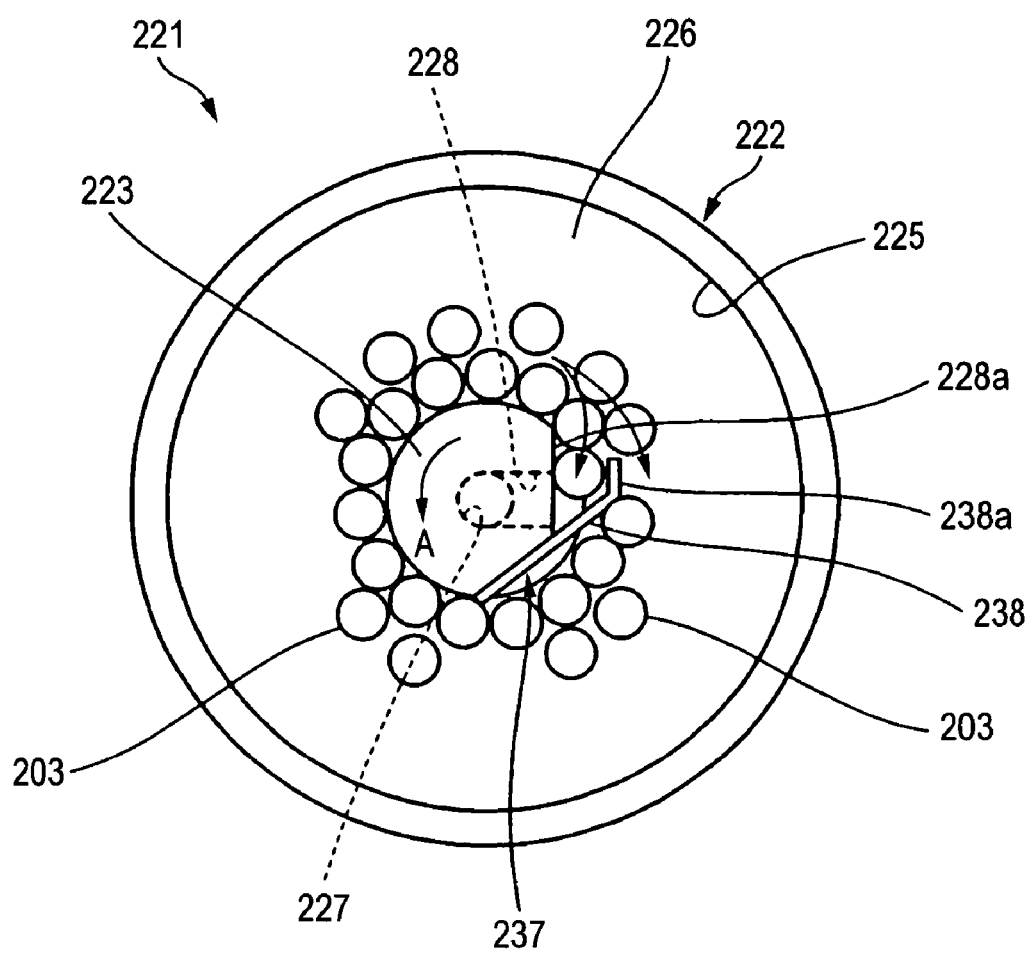
FIG. 19 is a schematic illustration showing operation of the parts supply device of Embodiment 5.

In the case where the steel balls 203 are supplied by the parts supply device 221 of the present embodiment, as shown in FIG. 19, the synchronous pulley 234 is driven by the synchronous belt not shown and the leading plate 237 is rotated in the direction A by the rotary shaft 223. Then, the steel balls 203, which have been put into the hopper, roll on the inclined face 226 by the dead weight and collect in the periphery of the rotary shaft 223. Then, the thus collected balls 203 are separated by the forward end portion 138a of the guide portion 238 of the leading plate 237 into the inside and the outside in the radial direction of the hopper 222. The steel balls 203, which have been separated into the outside in the radial direction, are rotated and stirred round the outside of the guide portion 238 of the leading plate 237.

The steel balls 203, which have been separated into the inside in the radial direction by the forward end portion 138a of the guide portion 238, that is, the steel balls 203, which have been separated onto the opening face 228a side, are guided into the opening of the introduction hole 228 of the opening face 228a by the guide portion 238 and delivered out from the delivery hole 227 through the introducing hole 228 by the dead weight and guided to an assembly device not shown.

As described above, in the parts supply device 221 of the present embodiment, while the steel balls 203 are being stirred by the forward end portion 138a of the guide portion 238, the steel balls 203, which have been separated onto the opening face 228a side, are guided into the introduction hole 228 by the guide portion 238. Accordingly, there is no possibility that the steel balls 203 are concentrated on the opening of the introduction hole 228. Therefore, no steel balls are blocked.

An allowable range of the interval between the forward end portion 138a and the opening face 228a can be set at a relatively high value. Therefore, the steel balls 203 can be delivered from the delivery hole 227 without making an adjustment again at the time of changing a production lot.

Further, at the time of a preparatory work in which a diameter of the steel ball 203 is changed, under the condition that the leading plate 237 is attached to the rotary shaft 223 in which the introducing hole 228 and the delivery hole 227, the diameters of which are fitted to the diameter of the steel ball 203, are formed, when the small diameter portion of the rotary shaft 223 is engaged with the inner circumferential face of the collar 233 and fixed by the tightening nut 235, the preparatory work of the parts supply device 221 can be easily performed. Accordingly, even in the case where the diameter of the steel ball 203 is changed, the parts supply device 221 can be obtained without making a highly accurate adjustment work.

As explained above, according to the present embodiment, there is provided a rotary shaft idly engaging with an engagement hole formed in the bottom portion of the funnel-shaped hopper having the inclined face which is decreased in the axial direction. In this rotary shaft, the introduction hole is formed which is formed in parallel with the inclined face and communicated with the delivery hole. Onto the opening face on which this introduction hole is open, and the leading plate is attached so as to introduce the spheres onto the introduction hole. Due to the above structure, the spheres, which have been put into the hopper, can be introduced into the introduction hole by the guide portion of the leading plate while the spheres are being stirred by the leading plate. Accordingly, it is possible to prevent the spheres, which are rolling on the inclined face by the dead weight, from concentrating on the opening of the introduction hole. Therefore, it is possible to prevent the spheres from being blocked. As a result, it is possible to provide an advantage that the spheres, which have been put into the hopper, can be smoothly delivered from the delivery hole.

In this connection, in the above explanation of the present embodiment, the delivery hole is a bag hole. However, when the delivery hole is made so that it can penetrate to an end face of the large diameter portion of the rotary shaft and a jet current is blown into the delivery hole from the same air nozzle as that of Embodiment 4 described before, it becomes possible to push out the steel balls from the delivery hole. Accordingly, no steel balls are left in the delivery hole.

In the above explanations of each embodiment, the sphere is a steel ball. However, it should be noted that the sphere is not limited to a steel ball. The sphere may be a ceramic sphere, a pearl sphere or a bead sphere including a sphere in which an insertion hole for inserting a thread is formed.

The sphere is not necessarily a real sphere. As long as it is a sphere capable of rolling on an inclined face by its dead weight, any sphere may be applied to the present invention and the same advantages as those described before can be provided.

Further, the parts supply device explained above in each embodiment may be used as a sphere supply device incorporated into an automated line. Alternatively, the parts supply device explained above in each embodiment may be used as a steel ball supply device, in which the number of the steel balls is counted, incorporated into a rolling bearing device or a ball screw device in which operation is manually conducted. In this case, when the parts supply device explained above in each embodiment is used as a steel ball supply device in which operation is manually conducted, a series of assembling work can be smoothly conducted without causing an interruption when the balls are prevented from being blocked. Therefore, it becomes possible to enhance the working property of the assembling work.

Embodiments 6 and 7

Referring to the drawings, sixth and seventh embodiments of the counter of the present invention will be explained below.

Embodiment 6

Figure 20:
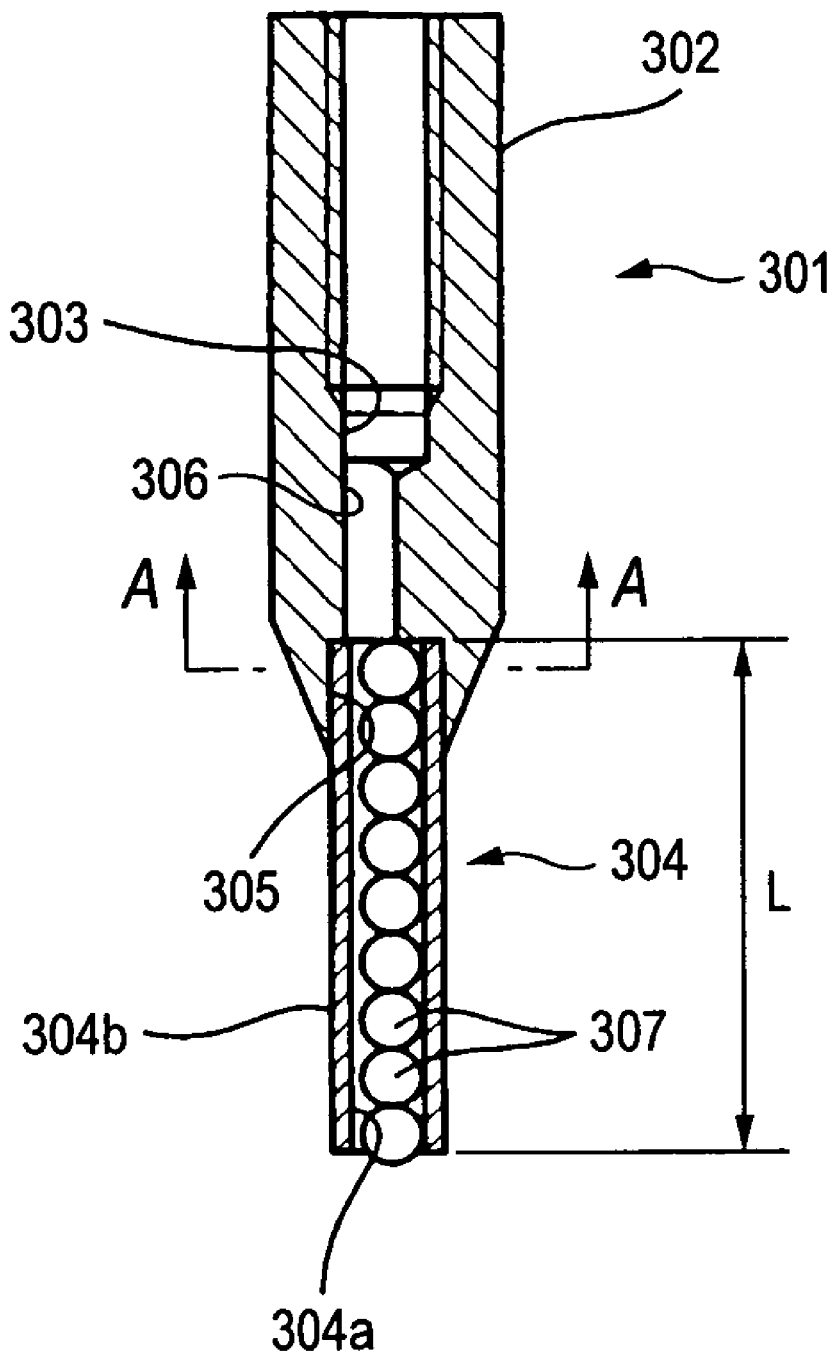
FIG. 20 is a sectional view showing a counter of Embodiment 6.
Figure 21:
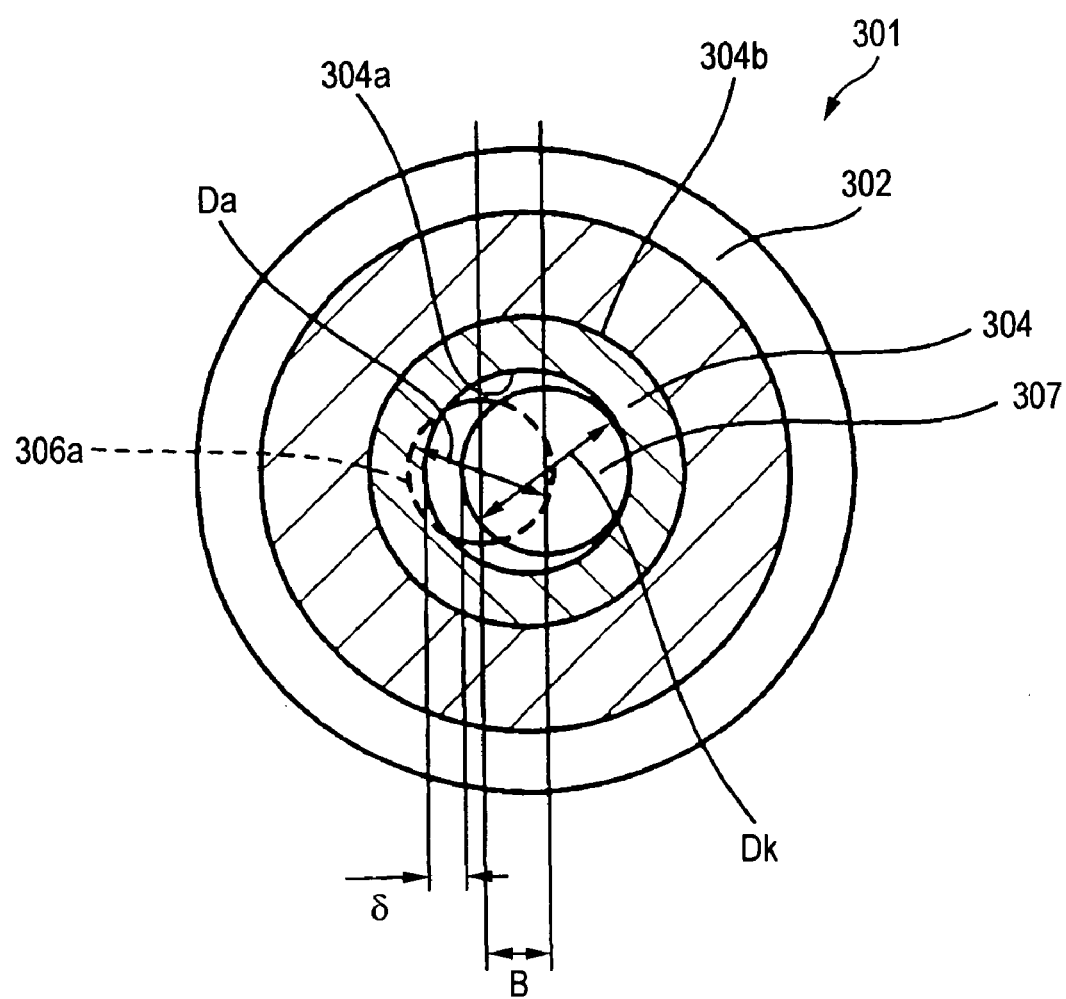
FIG. 21 is a sectional view taken on line A-A in FIG. 20.
Figure 22:
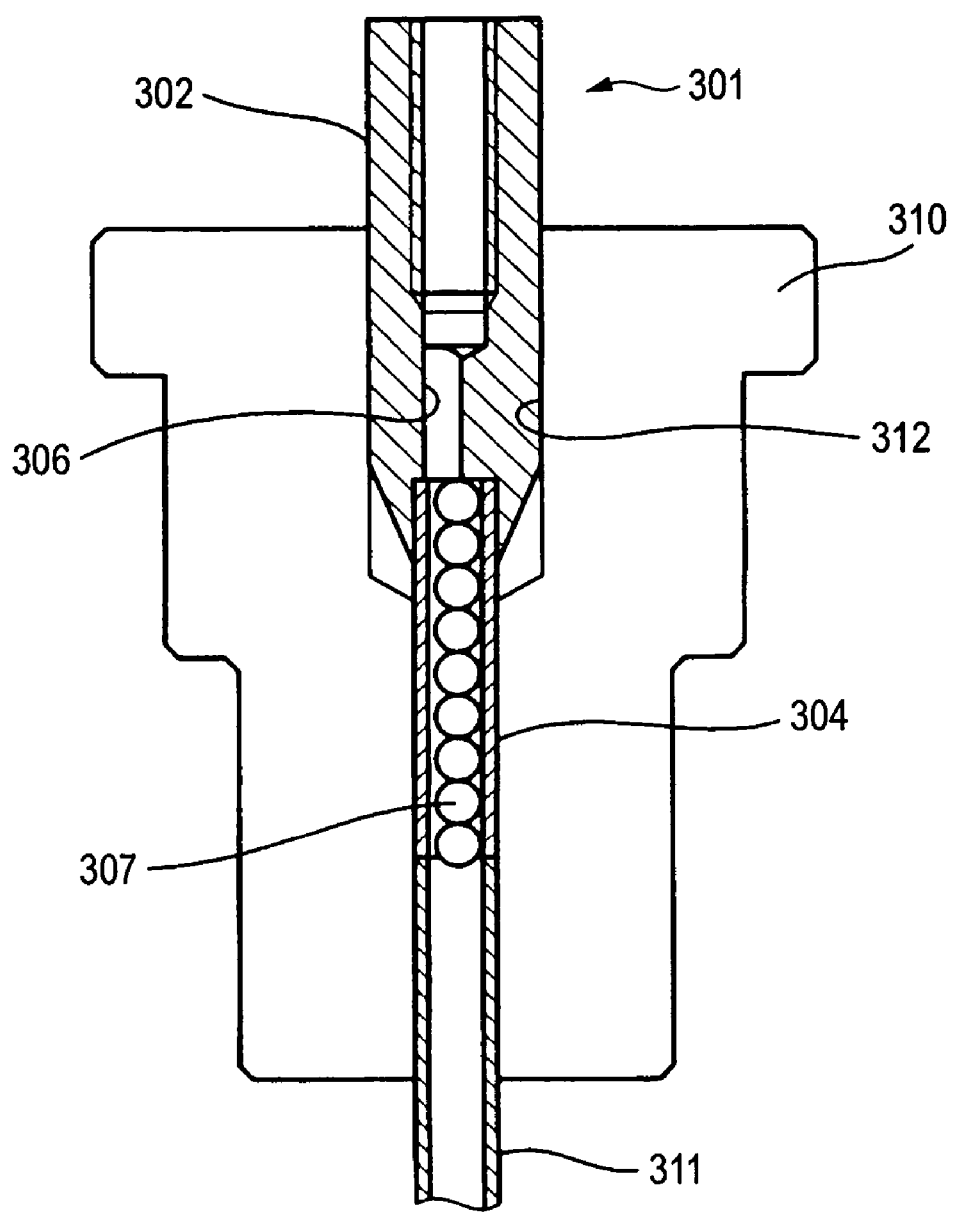
FIG. 22 is a schematic illustration showing a delivery holder of the counter of Embodiment 6.

FIG. 20 is a sectional view showing a counter of Embodiment 6. FIG. 21 is a sectional view taken on line A-A in FIG. 20. FIG. 22 is a schematic illustration showing a delivery holder of the counter of Embodiment 6.

In FIGS. 20 and 21, reference numeral 301 is a counter.

Reference numeral 302 is a main body, the shape of which is columnar, of the counter 301. In one end portion of the main body 302, a delivery hole 303 is provided, in which an attaching screw, to which a connector to be connected to a vacuum generating device such as a vacuum pump with a tube and others is attached, is formed. In the other end portion of the main body 302, an engagement hole 305 having a bottom engaged with a counting pipe 304 is formed. In this structure, the delivery hole 303 and the engagement hole 305 are communicated with each other by a suction hole 306.

The counting pipe 304 is a straight pipe member including: an inner diameter portion 304a having a diameter which is obtained when a predetermined gap δ (shown in FIG. 21) is added to a diameter (sphere diameter $D_k$) of a steel ball 307 which is a sphere to be counted; and an outer diameter portion 304b having a diameter which is obtained when a predetermined tightening margin is added to the inner diameter of the engagement hole 305. In the inner diameter portion 304a of the counting pipe 304, a predetermined number N of steel balls 307 to be counted are accommodated.

In FIG. 22, reference numeral 310 is delivery holder. To one end portion, a delivery tube 311 having an inner diameter, in which the steel ball 307 can pass through, is attached. In the other end portion, an insertion hole 312 is formed which is a stepped hole into which a counter 301 communicated with a delivery tube 311 is inserted.

An inner diameter of the delivery tube 311 is formed into a diameter not less than the diameter of the inner diameter portion 304a of the counting pipe 304, and the delivery tube 311 is arranged on the same axis as that of the inner diameter portion 304a. Due to the above structure, no steps are generated in a connecting portion between the inner diameter portion 304a of the counting pipe 304 and the inner diameter of the delivery tube 311. Accordingly, it is possible to smoothly deliver the steel balls 307 into the delivery tube 311.

The gap δ between the inner diameter of the inner diameter portion 304a of the counting pipe 304 and the steel ball 307 shown in FIG. 21 is set at a value so that the lowermost steel ball 307, which is one of the predetermined number N of steel balls 307 accommodated in the inner diameter portion 304a of the counting pipe 304, can not drop downward when the steel balls 307 are sucked by negative pressure supplied from the delivery hole 303 through the suction hole 306.

Length L of the counting pipe 304 shown in FIG. 20 is set at a length by which the spheres to be counted can be aligned and accommodated. Length L of the counting pipe 304 is set in the range defined by the following expression.

$$N \cdot D_k - D_k/2 \leq L < N(\delta^2 + D_k^2)^{0.5} + D_k/2$$

In this case, $D_k$ is a diameter of the steel ball, N is a predetermined number to be counted, and δ is the gap between the inner diameter of the inner diameter portion 304a of the counting pipe 304 and the steel ball 307.

When the length L is shorter than $(N \cdot D_k - D_k/2)$, the lowermost steel ball 307, which is one of the steel balls 307 aligned in one line, can not be sucked. When the length L is not less than $N(\delta^2 + D_k^2)^{0.5} + D_k/2$, an unnecessary steel ball 307 is sucked below the lowermost steel ball 307 which is one of the steel balls 307 accommodated being aligned zigzag.

The diameter $D_a$ of an opening 306a on the bottom face of the engagement hole 305 of the suction hole 306 shown in FIG. 21 may be any diameter. However, its center is arranged being shifted from the center of the inner diameter portion 304a of the counting pipe 304 in order to avoid the occurrence of a case in which the uppermost steel ball 307 closes the opening 306a.

When the steel balls 307 are counted with the counter 301 described above, counting operation is conducted as follows. The delivery hole 303 of the counter 301 is connected to a vacuum generator not shown in the drawing. While negative pressure is being supplied to the inner diameter portion 304a of the counting pipe 304 through the suction hole 306, the counting pipe 304 is inserted into a large number of steel balls 307 accommodated in the accommodation container. The steel balls 307 are sucked and held in the inner diameter portion 304a of the counting pipe 304 while they are being aligned. Then, the counting pipe 304 is pulled out from the steel balls 307 accommodated in the accommodation container and the number of the steel balls 307 is counted. In this way, the predetermined number N of the steel balls 307 to be counted can be counted.

While the steel balls 307 counted by the counter 301 in this way are being sucked and held in the counting pipe 304 by supplying negative pressure into the delivery hole 303, they are conveyed to a delivery holder 310. Then, the counter 301 is inserted and attached into the insertion hole 312. Then, supplying of the negative pressure is stopped and the delivery hole 303 is open to the atmosphere. Alternatively, pressurized air is supplied to the delivery hole 303, and the steel balls 307 are directly delivered into the delivery tube 311 by the dead weight of the steel balls 307 or the pressurized air.

When the steel balls 307 are directly delivered to the delivery tube 311 with the delivery holder 310 as described above, even in the case where pressurized air is used, the counted steel balls 307 can be prevented from being dispersed.

When the counted steel balls 307 are delivered with pressurized air, even in the case where the light steel balls 307, the sphere diameter $G_k$ of which is small, are delivered, the steel balls 307 can be smoothly delivered to the delivery tube 311.

According to the counter 301 of the present embodiment, the steel balls 307, the number N of which is predetermined, are aligned, sucked and held in the inner diameter portion 304a of the counting pipe 304. Therefore, irrespective of the sphere diameter $D_k$ of the steel ball 307, that is, irrespective of whether the dead weight of the steel ball 307 is heavy or light, the number of the steel balls can be stably counted.

In the case where the sphere diameter $D_k$ of the steel balls 307, the number of which is to be counted by the counter 301 of the present embodiment is changed, the counter 301; which is being used at present, may be replaced with a counter 301, which is previously prepared and adapted to the sphere diameter $D_k$ of the steel balls 307 to be counted and also adapted to the predetermined number N to be counted, and a tube connected to a vacuum generating device may be connected to the connector of the delivery hole 303. Therefore, it is unnecessary to adjust the pressure of pressurized air. Accordingly, a change in the preparatory work of the counter 301 can be easily and quickly executed.

In this case, when the negative pressure for sucking and holding the steel balls 307 is adjusted according to the dead weight of the steel balls 307 to be sucked and held, the manufacturing cost can be reduced. When the negative pressure is set at a value by which the maximum dead weight of the steel balls 307 to be handled by the counter 301 of the present embodiment can be sucked and held, it becomes unnecessary to adjust the negative pressure. Therefore, a change in the preparatory work of the counter can be more quickly conducted.

As described above, the counter 301 of the present embodiment is a simple device in which the counting pipe 304 is attached to the main body 302. Therefore, only when the counter 301 is replaced, a change in the preparatory work can be easily conducted. Accordingly, the present invention is especially effective when the number of steel balls 307 of a small lot, the change in the preparatory work of which must be frequently conducted, is counted.

Further, since no magnetic force is used for holding the steel balls 307, the steel balls 307 are not magnetized. Therefore, a step of demagnetizing is not needed.

In this connection, counting of the steel balls 307 and conveying of the counter 301 may be manually conducted by a worker. Alternatively, counting of the steel balls 307 and conveying of the counter 301 may be automatically conducted by a robot arm and others.

In the case where the counting work is automatically conducted, a changeover valve for changing over between the atmospheric pressure and the pressurized air may be provided and changed over by a control unit so as to count and deliver the steel balls 307.

Even in this case, it is unnecessary to adjust the pressure of the pressurized air when a change in the preparatory work is conducted. Further, it is also unnecessary to input a predetermined number N of the steel balls to be counted into the control unit. Therefore, the structure of the automation device can be made simple.

When the negative pressure is adjusted according to the dead weight of the steel balls in the same manner as that described before, it is possible to reduce the manufacturing cost. When the negative pressure is set at a value by which the maximum dead weight of the steel balls 307 to be handled by the counter 301 can be sucked and held, it becomes unnecessary to adjust the negative pressure. Therefore, the structure of the automation device can be made simplified.

As explained above, according to the present embodiment, the counting pipe is provided in which a predetermined number N of steel balls to be counted are aligned and accommodated in the main body in which the engagement hole having a bottom is formed. A diameter of the opening of the suction hole having an opening on the bottom face of the engagement hole is formed to be smaller than the sphere diameter $D_k$ of the steel ball. The center of the opening of the suction hole is arranged being shifted from the center of the inner diameter of the inner diameter portion of the counting pipe. Negative pressure is supplied to the suction hole so as to suck and hold the steel balls aligned in the counting pipe. Due to the above constitution, the number of the steel balls can be stably counted by the counter, the structure of which is simple, irrespective of the sphere diameter of the steel ball. Therefore, only when the counter is replaced, a change in the preparatory work of the counter can be easily conducted. Accordingly, it is possible to shorten a working time when the preparatory work of the counter is changed.

Embodiment 7

Figure 23:
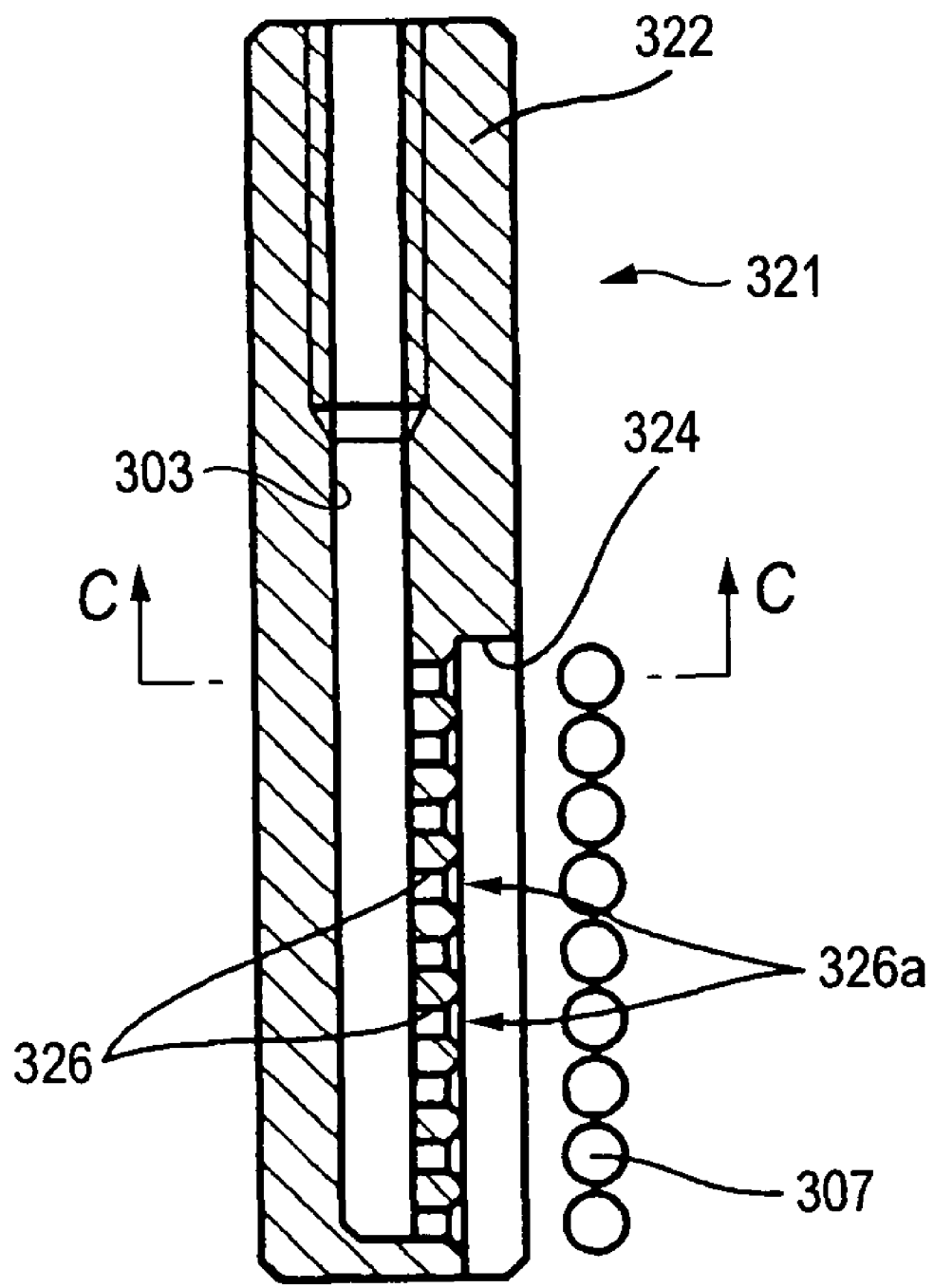
FIG. 23 is a sectional view showing a counter of Embodiment 7.
Figure 24:
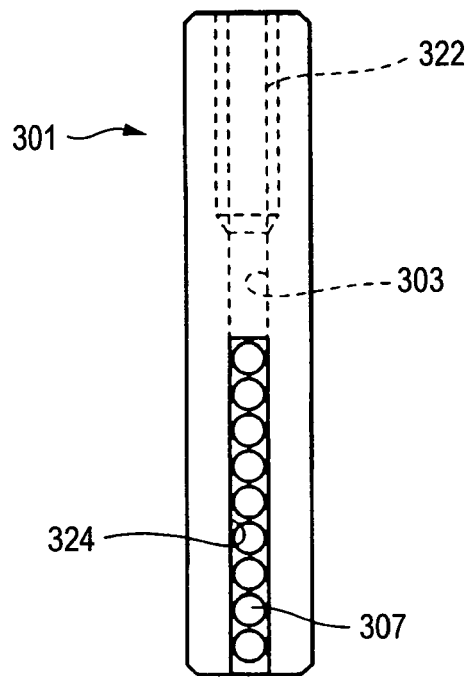
FIG. 24 is a front view showing the counter of Embodiment 7.
Figure 25:
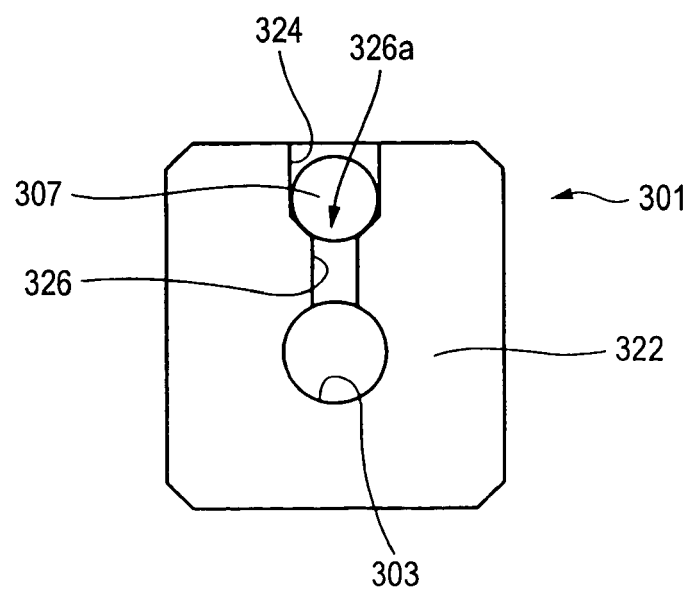
FIG. 25 is a sectional view taken on line C-C in FIG. 23.
Figure 26:
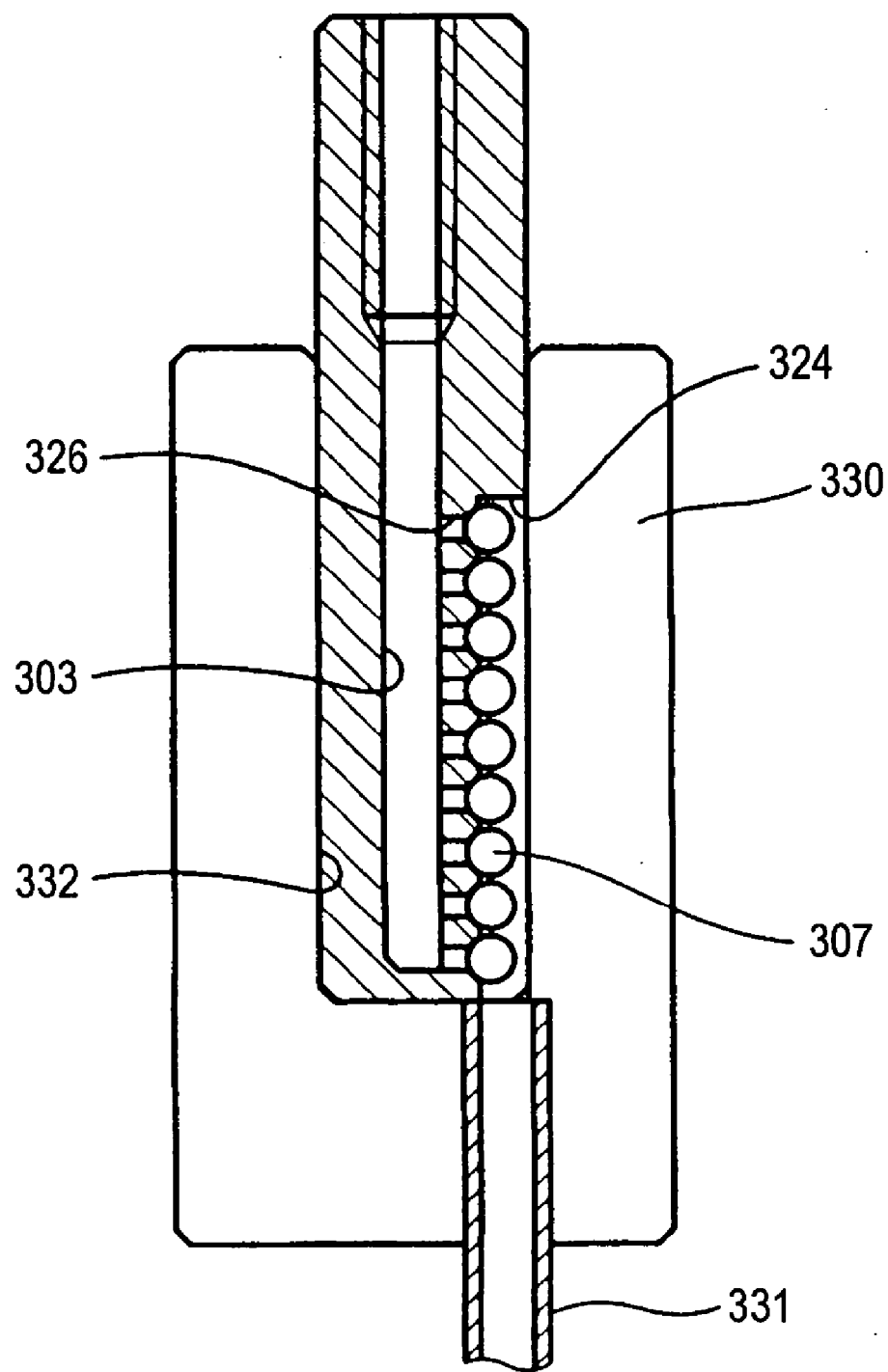
FIG. 26 is a schematic illustration showing a delivery holder of the counter of Embodiment 7.

FIG. 23 is a sectional view showing a counter of Embodiment 7. FIG. 24 is a front view showing the counter of Embodiment 7. FIG. 25 is a sectional view taken on line C-C in FIG. 23. FIG. 26 is a schematic illustration showing a delivery holder of the counter of Embodiment 7.

In this connection, like reference characters are used to indicate like parts in Embodiments 6 and 7, and the explanations are omitted here. Reference numeral 321 is a counter in FIGS. 23, 24 and 25.

Reference numeral 322 is a prism-shaped main body of a counter 321. In one end portion of the main body 322, in the same manner as that of Embodiment 6, a delivery hole 303, at the edge portion of which an attaching screw is provided, is formed in the axial direction. On one side of the main body 322, a counting groove 324, which is a measurement recess portion for accommodating a predetermined number N of steel balls 307 to be counted, is formed.

As shown in FIG. 25, the width and depth of the counting groove 324 are larger than the sphere diameter $D_k$ of the steel ball 307 which is a sphere to be counted and smaller than 1.5 times of the sphere diameter $D_k$ of the steel ball 307. In this case, it is preferable that the width and depth of the counting groove 324 are smaller than 1.1 times of the sphere diameter $D_k$ of the steel ball 307. As shown in FIGS. 23 and 24, an end portion on the opposite side of the attaching screw of the delivery hole 303 is a groove, the cross section of which is a rectangle, which is open to an end face on the side of the main body 322. On the bottom face of the groove, openings 326a of the suction holes 326 communicated with the delivery hole 303, the number of which is the same as that of the predetermined number N to be measured, are formed.

In FIG. 26, reference numeral 330 is a delivery holder. At one end portion of the delivery holder 330, a delivery tube 331 having an inner diameter, in which the steel balls 307 can pass through, is attached. On a bottom face of the other end, an insertion hole 332 is formed which is a square hole to be inserted by the counter 301 communicated with the delivery tube 331.

The delivery tube 331 is attached to a position of the end portion on the bottom face of the insertion hole 332 so that the delivery tube 331 can be communicated with an open portion of the end portion of the counting groove 324 when the counter 321 is inserted into the insertion hole 332.

An inner diameter of the delivery tube 331 is formed into a diameter which is not less than the diameter of the circumscribed circle which is circumscribed with the rectangular shape formed out of the width and depth of the counting groove 32. Due to this structure, no step portion is formed in the connecting portion between the counting groove 324 and the inner diameter of the delivery tube 331. Therefore, the steel balls 307 can be smoothly delivered into the delivery tube 331.

The diameter $D_b$ of a suction hole 326 is formed to be smaller than the sphere diameter $D_k$. In an opening 326a of the suction hole 326 onto the bottom face of the counting groove 324, chamfering is conducted. An interval between the centers of the suction holes 326, which are adjacent to each other, is larger than the sphere diameter $D_k$ in order to prevent the adjoining steel balls 307 from being piled up on each other.

In the case where the steel balls 307 are counted with the counter 321 composed as described above, counting operation is conducted as follows. The delivery hole 303 of the counter 321 is connected to a vacuum generating device not shown. While negative pressure is being supplied to the suction hole 326, the main body 322 of the counter 321 is inserted into a large number of steel balls 307 accommodated in an accommodation container. Then, the steel balls 307 are sucked, held and aligned one by one in the opening 326a of the suction hole 326 on the bottom face of the counting groove 324. When the counter 321 is pulled out from the steel balls 307 accommodated in the accommodation container, the number of the steel balls 307 is counted.

When the steel balls 307, the number of which has been counted by the counter 301, are sucked and held by the counting groove 324 while negative pressure is being supplied to the delivery hole 303, the steel balls 307 are conveyed to the delivery holder 330. The counter 321 is inserted into the insertion hole 332 while the open portion of the counting groove 324 is being directed to the delivery tube 331. Supplying of the negative pressure is stopped and the delivery hole 303 is opened to the atmosphere. Alternatively, when the pressurized air is supplied into the delivery hole 303, the steel balls 307 are directly delivered into the delivery tube 331 by a pushing force generated by the dead weight of the steel balls 307 or the pressurized air.

In this case, the counting groove 324 is formed into a rectangular section having a width and depth larger than the sphere diameter $D_k$ of the steel ball 307 and smaller than 1.5 times of the sphere diameter $D_k$ of the steel ball 307. It is preferable that the width and depth is not less than 1.1 times of the sphere diameter $D_k$ of the steel ball 307. Therefore, a component force, which is generated when the steel balls 307 push one another, is reduced to be lower than a component force in the delivery direction. Therefore, the steel balls 307 are delivered into the delivery tube 331 under the condition that the steel balls 7 are aligned.

When the steel balls 307 are directly delivered to the delivery tube 331 with the delivery holder 330 as described above, even in the case where pressurized air is used, the counted steel balls 307 can be prevented from being dispersed.

When the counted steel balls 307 are delivered with pressurized air, even in the case where the light steel balls 307, the sphere diameter $G_k$ of which is small, are delivered, the steel balls 307 can be smoothly delivered to the delivery tube 331.

According to the counter 321 of the present embodiment, the openings 326a of the suction holes 326, the number of which is the same as the predetermined number N of the steel balls 307 to be counted, provided on the bottom face of the counting groove 324 suck and hold the steel balls 307 one by one. Therefore, irrespective of whether the dead weight of the steel ball 307 is heavy or light, the number of the steel balls 307 can be stably counted. Further, even in the case of a steel ball 307, the sphere diameter $G_k$ of which is large and the dead weight of which is heavy, and even in the case where the predetermined number N of the steel balls 307 to be counted is large, the steel balls 307 can be positively held.

In the case where the sphere diameter $D_k$ of the steel balls 307 to be counted of the counter 321 of the present embodiment is changed, if an interval of the adjoining suction holes 326 of the counter 321 used at present satisfies the above condition and the predetermined number N to be counted is the same, the number of the steel balls 307, the diameter $D_k$ of which is different, can be counted without replacing the counter 301.

In the case where the above condition (the interval of the suction holes 326 and the predetermined number N of the steel balls 307) is not satisfied, the counter 321 may be replaced with another counter 321 previously prepared which is adapted to the sphere diameter $D_k$ of the steel balls 307 to be counted and also adapted to the predetermined number N of the steel balls 307 to be counted, and a tube connected to the vacuum generating device may be connected to the connector of the delivery hole 303. Accordingly, it is unnecessary to adjust the negative pressure and the pressure of the pressurized air. Therefore, a change in the preparatory work of the counter 321 can be easily, quickly conducted.

As explained above, the counter 321 of the present embodiment is a simple device, in the main body of which the counting groove 324 is formed. Therefore, in the case where a predetermined condition is satisfied, the counter 321 is not replaced. In the case where the predetermined condition is not satisfied, the counter 321 is replaced. In this way, a change in the preparatory work of the counter 321 can be easily performed. Therefore, the present embodiment is especially effective when the number of the steel balls 307 is counted in the production of a small lot in which a change in the preparatory work must be frequently conducted.

Further, since no magnetic force is used for holding the steel balls 307, there is no possibility that the steel balls 307 are magnetized. Accordingly, it is unnecessary to provide a step of demagnetizing the steel balls 307.

In this connection, counting of the steel balls 307 and conveying of the counter 321 may be manually conducted by a worker. Alternatively, counting of the steel balls 307 and conveying of the counter 301 may be automatically conducted by a robot arm and others.

In the case where the work is automatically conducted, a changeover valve for changing over between the atmospheric pressure and the pressurized air may be provided and changed over by a control unit so as to count and deliver the steel balls 307.

Even in this case, it is unnecessary to adjust the pressure of the pressurized air when a change in the preparatory work is conducted. Further, it is also unnecessary to input a predetermined number N of the steel balls, which is counted, into the control unit. Therefore, the structure of the automation device can be made simple. Since the suction holes 326, the number of which is the same as the predetermined number N of the steel balls 307, are provided, when a pressure sensor is provided in a negative pressure passage, it is possible to detect a failure in the sucking motion. Therefore, a mistake of counting the number of the steel balls can be automatically detected by the automation device.

In the same manner as that of Embodiment 6 described above, when the negative pressure for sucking and holding the steel balls 307 is adjusted according to the dead weight of the steel balls 307, the manufacturing cost can be reduced. When the negative pressure is set at a value by which the maximum dead weight of the steel balls 307 to be handled by the counter 301 of the present embodiment can be sucked and held, it becomes unnecessary to adjust the negative pressure. Therefore, a structure of the automation device can be made simpler.

As explained above, according to the present embodiment, the suction holes, the number of which is the same as the predetermined number N of the steel balls to be counted, are open on the bottom face of the counting groove provided in the main body. A diameter of each suction hole is formed to be smaller than the sphere diameter $D_k$ of the steel balls, and an interval between the suction holes, which are adjacent to each other, is set to be larger than the sphere diameter $D_k$ of the steel ball. Negative pressure is supplied to the suction hole, so that the steel balls can be sucked and held one by one in the suction holes. Due to the foregoing, by the counter, the structure of which is simple, irrespective of the sphere diameter of the steel balls, the steel balls can be positively sucked and held, so that the number of the steel balls can be stably counted. Further, when a predetermined condition is satisfied, the counter is not replaced. When a predetermined condition is not satisfied, only by replacing the counter, a change in the preparatory work of the counter can be easily conducted. Therefore, it is possible to further shorten a working time when a change in the preparatory work of the counter is conducted.

In this connection, in the above explanation of the present embodiment, the opening 326a of the suction hole 326 is chamfered. However, even when the opening 326a of the suction hole 326 is not chamfered, the same effect can be provided when the steel balls 307 are sucked into the suction holes 326 one by one.

In the present embodiment explained above, the steel balls 307 are sucked and held one by one into the suction holes 326 having the opening 326a on the bottom face of the counting groove 324. However, it is possible to adopt another embodiment shown in FIGS. 27 and 28.

Figure 27:
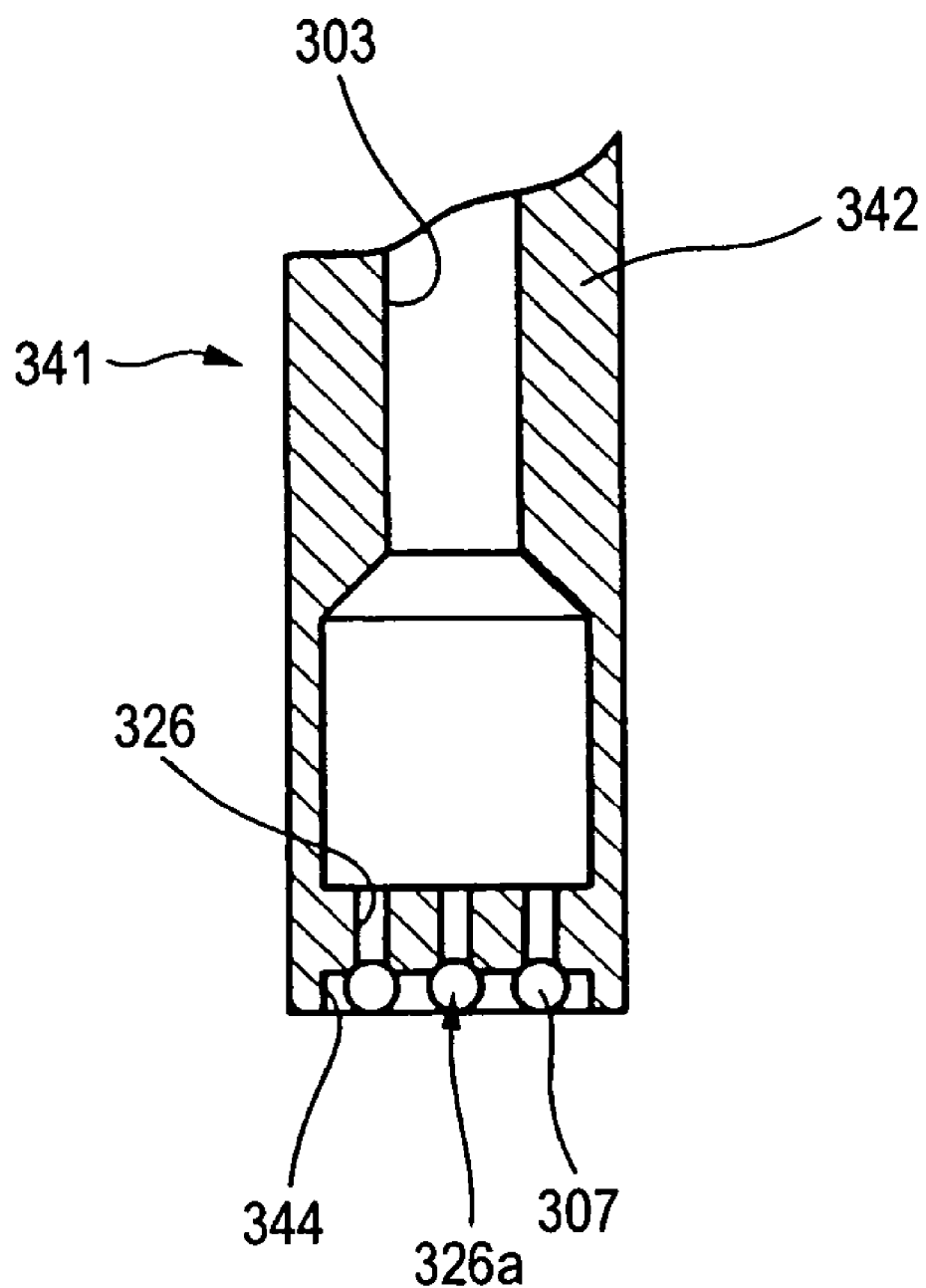
FIG. 27 is a sectional view showing another form of the counter of Embodiment 7.
Figure 28:
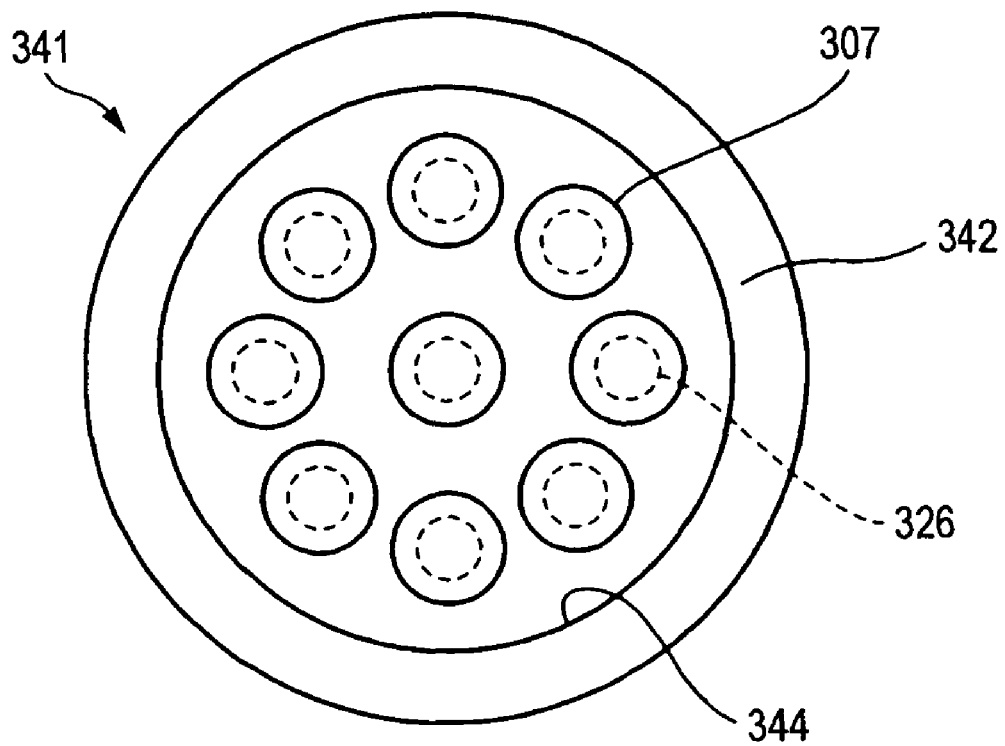
FIG. 28 is a lower face view showing another form of the counter of Embodiment 7.

In the counter 341 shown in FIGS. 27 and 28, on an end face of the end portion on the opposite side to the delivery hole 303 formed in the axial direction of the columnar main body 342, a counting hole 344 having a bottom is formed which is a measurement recess portion for accommodating the steel balls 307, the number N of which is the same as the number of the steel balls 307 to be counted.

As shown in FIG. 28, on the bottom face of the counting hole 344, the openings 326a of the suction holes 326 communicated with the delivery hole 303, the number of which is the same as the predetermined number N of the steel balls to be measured, are formed. The diameter $D_h$ of the suction hole 326 is formed to be smaller than the sphere diameter $D_k$. In order to prevent the steel balls 307, which are adjacent to each other, from being piled up, an interval between the centers of the suction holes 326 which are adjacent to each other, is set to be larger than the sphere diameter $D_k$, and the suction holes 326 are radially arranged at the center of the counting hole 344 and its periphery.

Even when the above counting hole 344 is provided in the counter, the same effect as that of Embodiment 7 can be provided.

Figure 29:
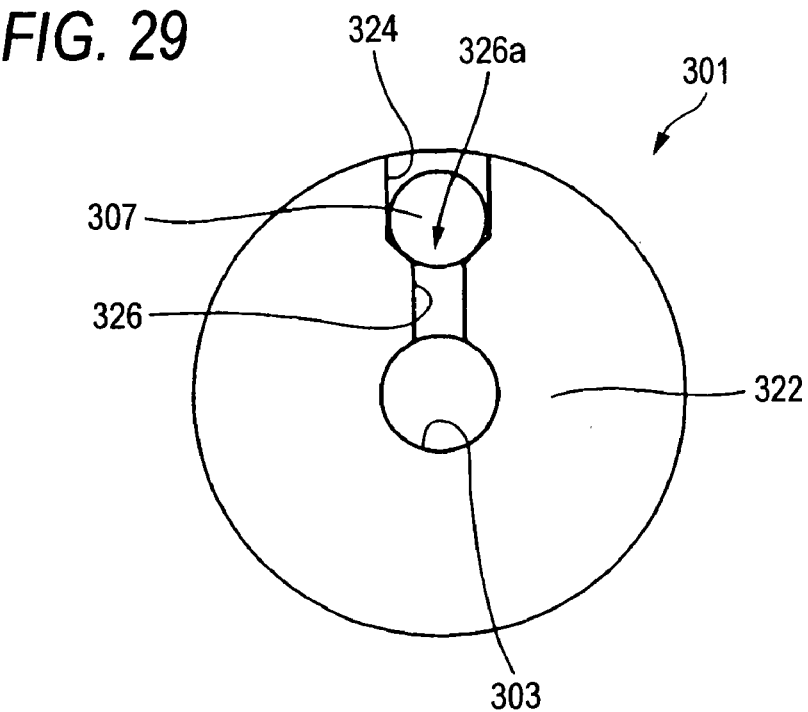
FIG. 29 is a sectional view showing another form of a cross-sectional shape of the counter of Embodiment 7.
Figure 30:
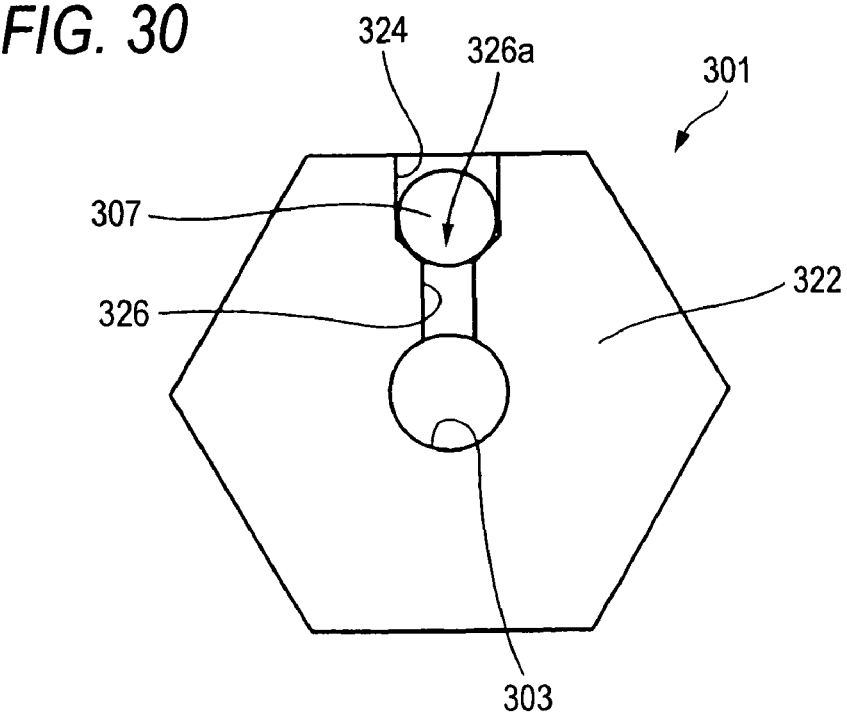
FIG. 30 is a sectional view showing another form of the cross-sectional shape of the counter of Embodiment 7.

Further, in the embodiment explained above, a shape of the main body 322 composing the counting groove 324 is a prism-shape. However, the shape of the main body 322 may be a columnar shape, the shape of the cross section of which is shown in FIG. 29. Alternatively, the shape of the main body 322 may be a polygonal shape shown in FIG. 30. As long as the counting groove 24, the suction hole 326 and the delivery hole 303 can be formed in it, any shape may be adopted. In this case, the insertion hole 332 is formed into a shape into which the main body 322 can be inserted.

In each embodiment described above, the sphere is a steel ball. However, it should be noted that the sphere is not limited to the steel ball. The sphere may be a ceramic sphere made of ceramic material. Alternatively, the sphere may be a resin sphere made of resin material.

While there has been described in connection with the preferred embodiments of the present invention, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. An assembly apparatus for assembling a ball screw device which comprises:
   a screw shaft provided with a spiral shaft raceway groove on an outer circumference thereof
   a cylindrical nut provided with a nut raceway groove on an inner circumferential face thereof so as to oppose to the shaft raceway groove,
   a connection passage that makes a circulation passage together with the shaft raceway groove and the nut raceway groove; and
   a plurality of balls circulating in the circulation passage, the assembly apparatus comprising:
   a support block;
   a nut arranged in the longitudinal direction;
   a nut reception base that arranges the nut so that its axial direction is towards a vertical direction of the assembly apparatus and that supports the nut so as to elevate the nut with respect to the support block;
   a temporary shaft that is inserted into an inner diameter side of the nut arranged on the nut reception base and that is rotatably supported by the support block;
   an inclined face provided at a forward end portion of the temporary shaft, for guiding the balls, the number of which is the same as that of the balls to be charged into the circulation passage into the nut raceway groove; and
   a pushing mechanism that has elasticity in the radial direction of the temporary shaft and that pushes the balls which are fed into the nut raceway groove by a forward end portion protruding from an outer circumferential face of the temporary shaft, wherein
   the pushing mechanism comprises:
   a protruding member protruding from the outer circumferential face of the temporary shaft; and
   an annular elastic member arranged on the central side of the temporary shaft for pushing the protruding member.

2. An assembly apparatus for assembling a ball screw device which comprises:
   a screw shaft provided with a spiral shaft raceway groove on an outer circumference thereof
   a cylindrical nut provided with a nut raceway groove on an inner circumferential face thereof so as to oppose to the shaft raceway groove;
   a connection passage that makes a circulation passage together with the shaft raceway groove and the nut raceway groove; and
   a plurality of balls circulating in the circulation passage, the assembly apparatus comprising:
   a support block;
   a nut arranged in the longitudinal direction;
   a nut reception base that arranges the nut so that its axial direction is towards a vertical direction of the assembly apparatus and that supports the nut so as to elevate the nut with respect to the support block;
   a temporary shaft that is inserted into an inner diameter side of the nut arranged on the nut reception base and that is rotatably supported by the support block;
   an inclined face provided at a forward end portion of the temporary shaft, for guiding the balls, the number of which is the same as that of the balls to be charged into the circulation passage into the nut raceway groove; and
   a pushing mechanism that has elasticity in the radial direction of the temporary shaft and that pushes the balls which are fed into the nut raceway groove by a forward end portion protruding from an outer circumferential face of the temporary shaft, wherein
   the pushing mechanism comprises a plate-shaped elastic body that engages with a slit penetrating the temporary shaft in the radial direction, and that both end portions of the plate-shaped elastic body protrude from the outer circumferential face of the temporary shaft.

3. The assembly apparatus for assembling a ball screw device according to claim 1, wherein
   the nut comprises the connection passage which extends in the axial direction of the nut.

4. An assembling method for assembling a ball screw device by using an assembly apparatus,
   the ball screw device comprising:
   a screw shaft provided with a spiral shaft raceway groove on an outer circumference thereof;
   a cylindrical nut provided with a nut raceway groove on an inner circumferential face thereof so as to oppose to the shaft raceway groove;
   a connection passage that makes a circulation passage together with the shaft raceway groove and the nut raceway groove; and a plurality of balls circulating in the circulation passage, the assembly apparatus comprising:

a support block;

a nut arranged in the longitudinal direction;

a nut reception base that arranges the nut so that its axial direction is towards a vertical direction of the assembly apparatus and that supports the nut so as to elevate the nut with respect to the support block;

a temporary shaft that is inserted into an inner diameter side of the nut arranged on the nut reception base and that is rotatably supported by the support block;

an inclined face provided at a forward end portion of the temporary shaft, for guiding the balls into the nut raceway groove, the number of the balls is the same as that of the balls to be charged into the circulation passage; and a pushing mechanism that has elasticity in the radial direction of the temporary shaft and that pushes the balls which are fed into the nut raceway groove by a forward end portion protruding from an outer circumferential face of the temporary shaft, wherein the pushing mechanism comprises:

a protruding member protruding from the outer circumferential face of the temporary shaft; and an annular elastic member arranged on the central side of the temporary shaft for pushing the protruding member, the assembling method comprising:

putting the balls which are to be charged into the circulation passage onto the inclined face of the temporary shaft; and rotating the temporary shaft so as to feed the balls into the connection passage by frictional force generated between the protruding member and the balls fed into the nut raceway groove.

5. The assembly apparatus for assembling a ball screw device according to claim 2, wherein the nut comprises the connection passage which extends in the axial direction of the nut.

6. An assembling method for assembling a ball screw device by using an assembly apparatus, the ball screw device comprising:

a screw shaft provided with a spiral shaft raceway groove on an outer circumference thereof;

a cylindrical nut provided with a nut raceway groove on an inner circumferential face thereof so as to oppose to the shaft raceway groove;

a connection passage that makes a circulation passage together with the shaft raceway groove and the nut raceway groove; and a plurality of balls circulating in the circulation passage, the assembly apparatus comprising:

a support block;

a nut arranged in the longitudinal direction;

a nut reception base that arranges the nut so that its axial direction is towards a vertical direction of the assembly apparatus and that supports the nut so as to elevate the nut with respect to the support block;

a temporary shaft that is inserted into an inner diameter side of the nut arranged on the nut reception base and that is rotatably supported by the support block;

an inclined face provided at a forward end portion of the temporary shaft, for guiding the balls into the nut raceway groove, the number of the balls is the same as that of the balls to be charged into the circulation passage; and a pushing mechanism that has elasticity in the radial direction of the temporary shaft and that pushes the balls which are fed into the nut raceway groove by a forward end portion protruding from an outer circumferential face of the temporary shaft, wherein the pushing mechanism comprises a plate-shaped elastic body that engages with a slit penetrating the temporary shaft in the radial direction, and that both end portions of the elastic body protrude from the outer circumferential face of the temporary shaft, the assembling method comprising:

putting the balls which are to be charged into the circulation passage onto the inclined face of the temporary shaft; and rotating the temporary shaft so as to feed the balls into the connection passage by frictional force generated between the end portions of the plate-shaped elastic body and the balls fed into the nut raceway groove.

\* \* \* \* \*